(12) United States Patent
Richert et al.

(10) Patent No.: US 9,177,245 B2
(45) Date of Patent: Nov. 3, 2015

(54) SPIKING NETWORK APPARATUS AND METHOD WITH BIMODAL SPIKE-TIMING DEPENDENT PLASTICITY

(71) Applicant: QUALCOMM TECHNOLOGIES INC., San Diego, CA (US)

(72) Inventors: Micah Richert, San Diego, CA (US); Filip Piekniewski, San Diego, CA (US); Eugene Izhikevich, San Diego, CA (US); Sach Sokol, Washington, DC (US); Victor Hokkiu Chan, Del Mar, CA (US); Jeffrey Alexander Levin, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 295 days.

(21) Appl. No.: 13/763,005

(22) Filed: Feb. 8, 2013

(65) Prior Publication Data

US 2014/0229411 A1 Aug. 14, 2014

(51) Int. Cl.
*G06N 3/08* (2006.01)
*G06N 3/04* (2006.01)

(52) U.S. Cl.
CPC . *G06N 3/08* (2013.01); *G06N 3/049* (2013.01)

(58) Field of Classification Search
None
See application file for complete search history.

(56) References Cited

U.S. PATENT DOCUMENTS

2013/0297539 A1* 11/2013 Piekniewski et al. ........... 706/20

OTHER PUBLICATIONS

Timothee Masquelier, "Learning Mechanisms to Account for the Speed, Selectivity and Invariance of Responses in the Visual Cortex", phD thesis published by Université Toulouse III—Paul Sabatier, U.F.R. Sciences de la Vie et de la Terre, Feb. 15, 2008, pp. 1-192.*
Lyle N. Long and Ankur Gupta, "Biologically-Inspired Spiking Neural Networks with Hebbian Learning for Vision Processing", AIAA Paper No. 2008-0885, presented at AIAA 46th Aerospace Sciences Meeting, Reno NV Jan. 2008, pp. 1-17.*
Rafael Serrano-Gotarredona, Teresa Serrano-Gotarredona, Antonio Acosta-Jiménez, and Bernabé Linares-Barranco, "A Neuromorphic Cortical-Layer Microchip for Spike-Based Event Processing Vision Systems", Circuits and Systems I: Regular Papers, IEEE Transactions on (vol. 53 , Issue: 12 ), Dec. 12, 2006, pp. 2548-2566.*
Lars Buesing, Wolfgang Maass, "Simplified Rules and Theoretical Analysis for Information Bottleneck Optimization and PCA with Spiking Neurons", NIPS Proceedings, 2007, "http://papers.nips.cc/paper/3168-simplified-rules-and-theoretical-analysis-for-information-bottleneck-optimization-and-pca-with-spiking-neurons", 2007, pp. 1-8.*

(Continued)

*Primary Examiner* — Kakali Chaki
*Assistant Examiner* — Walter Hanchak
(74) *Attorney, Agent, or Firm* — Seyfarth Shaw LLP

(57) ABSTRACT

Apparatus and methods for learning in response to temporally-proximate features. In one implementation, an image processing apparatus utilizes bi-modal spike timing dependent plasticity in a spiking neuron network. Based on a response by the neuron to a frame of input, the bi-modal plasticity mechanism is used to depress synaptic connections delivering the present input frame and to potentiate synaptic connections delivering previous and/or subsequent frames of input. The depression of near-contemporaneous input prevents the creation of a positive feedback loop and provides a mechanism for network response normalization.

2 Claims, 16 Drawing Sheets

(56) References Cited

OTHER PUBLICATIONS

N Venkateswaran, B Harish, R Chidambareswaran, "A Novel Perspective into the Neuronal Encoding Along the Retinal Pathway Employing Time-Frequency Transformation: Part II—For Color", Brain Inspired Cognitive systems, 2004, pp. BIS4-3 1-BIS4-3 7.*

Zhijun Yang, Alan Murray, Florentin Worgotter, Katherine Cameron, Vasin Boonsobhak, "A Neuromorphic Depth-from-Motion Vision Model with STDP Adaptation", Neural Networks, IEEE Transactions on (vol. 17, Issue: 2), Mar. 2006, pp. 482-495.*

Christo Panchev, "Temporal Processing in a Spiking Model of the Visual System", S. Kollias et al. (Eds.): ICANN 2006, Part I, LNCS 4131, Springer-Verlag, Berlin, 2006, pp. 750-759.*

Timothée Masquelier, "Learning Mechanisms to Account for the Speed, Selectivity and Invariance of Responses in the Visual Cortex", phD Thesis published by U.F.R. Sciences de la Vie et de la Terre, Université Toulouse III—Paul Sabatier, 2008, pp. 1-194.*

* cited by examiner

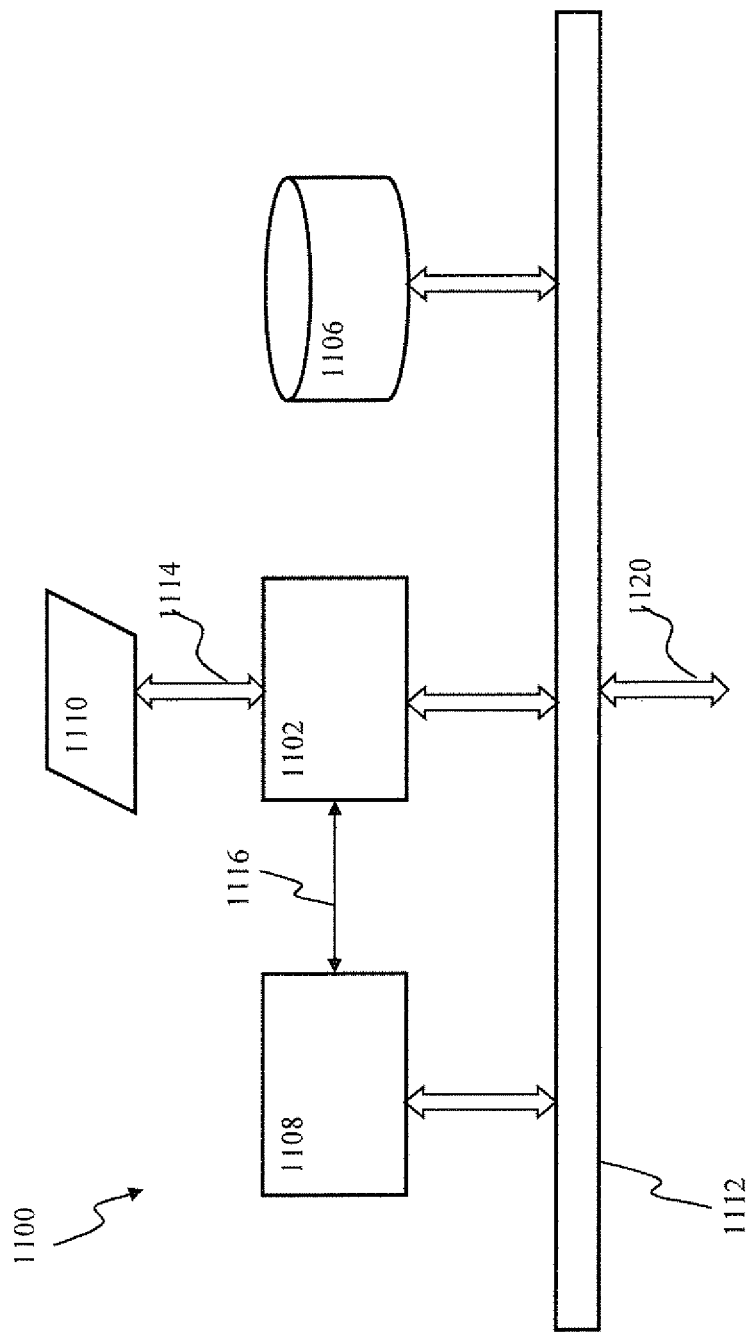

SPIKING NETWORK APPARATUS AND METHOD WITH BIMODAL SPIKE-TIMING DEPENDENT PLASTICITY

CROSS-REFERENCE TO RELATED APPLICATIONS

This application is related to a co-pending and co-owned U.S. patent application Ser. No. 13/152,105, entitled "APPARATUS AND METHODS FOR TEMPORALLY PROXIMATE OBJECT RECOGNITION", filed Jun. 2, 2011, U.S. patent application Ser. No. 13/488,106, entitled "SPIKING NEURON NETWORK APPARATUS AND METHODS", filed Jun. 4, 2012, U.S. patent application Ser. No. 13/541,531, entitled "CONDITIONAL PLASTICITY SPIKING NEURON NETWORK APPARATUS AND METHODS", filed Jul. 3, 2012, U.S. patent application Ser. No. 13/548,071, entitled "SPIKING NEURON NETWORK SENSORY PROCESSING APPARATUS AND METHODS", filed Jul. 12, 2012, U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/691,554, entitled "RATE STABILIZATION THROUGH PLASTICITY IN SPIKING NEURON NETWORK", filed Nov. 30, 2012, U.S. patent application Ser. No. 13/710,042, entitled "CONTRAST ENHANCEMENT SPIKING NEURON NETWORK SENSORY PROCESSING APPARATUS AND METHODS", filed Dec. 10, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to artificial neuron networks, and more particularly in one exemplary aspect to computerized apparatus and methods for encoding sensory input using spiking neuron networks.

2. Description of Related Art

Object recognition in the context of computer vision relates to finding a given object in an image or a sequence of frames in a video segment. Typically, temporally proximate features that have high temporal correlations are identified within the sequence of frames, with each successive frame containing a temporally proximate representation of an object. Object representations, also referred to as the "view", may change from frame to frame due to a variety of object transformations, such as rotation, movement/translation, change in lighting, background, noise, appearance of other objects, partial blocking/unblocking of the object, etc. Temporally proximate object representations occur when the frame rate of object capture is commensurate with the timescales of these transformations, so that at least a subset of a particular object representation appears in several consecutive frames. Temporal proximity of object representations allows a computer vision system to recognize and associate different views with the same object (for example, different phases of a rotating triangle are recognized and associated with the same triangle). Such temporal processing (also referred to as learning), enables object detection and tracking based on an invariant system response with respect to commonly appearing transformations (e.g., rotation, scaling, and translation).

Although temporal correlation between successive frames are reduced by discontinuities, sudden object movements, and noise, temporal correlations are typically useful for tracking objects evolving continuously and slowly, e.g., on time scales that are comparable to the frame interval, such as tracking human movements in a typical video stream of about 24 frames per second (fps).

Some existing approaches to binding (associating) temporarily proximate object features from different frames may rely on the rate based neural models. Rate-based models encode information about objects into a dimensionless firing rate, characterized by neuron spike count or by a mean neuron firing rate. An object (and/or object feature) is detected based on matching of an observed rate to a predetermined value associated with the object representation. As a result, in order to encode and recognize different representation of the same object (i.e., a bar of different lengths), the existing methods require different detector nodes that each specialize in a single object representation. Invariably, such systems scale poorly with an increase in the number of objects, their variety and complexity. Additionally, the use of specialized detectors without detector reuse requires detection apparatus with an increased numbers of detectors in order to perform detection of more complex objects. Furthermore, such rate-based approaches merely encode data frames into dimensionless activity of detector nodes, while completely neglecting the short-term temporal interactions between nodes.

SUMMARY

The present disclosure satisfies the foregoing needs by providing, inter alia, apparatus and methods for implementing bi-modal plasticity rules for processing sensory inputs.

In a first aspect of the disclosure, a method of detecting a representation of an object in a sequence of frames with a spiking neuron network is disclosed. In an embodiment, the method includes: (i) communicating a spiking signal to a neuron via a plurality of connections, and (ii) based on a response generated by the neuron: (a) depressing a first connection of the plurality of connections, the first connection providing the first portion of the spiking signal, and (b) potentiating a second connection of the plurality of connections, the second connection providing a second portion of the spiking signal.

In a variant, the response corresponds to a first frame of a sequence of frames, and the spiking signal corresponds to a second frame of the sequence of frames. The second frame is adjacent the first frame. The spiking signal is configured based on one or more frames of the sequence of frames.

In a second aspect of the disclosure, a computerized spiking neuron apparatus is disclosed. In an embodiment, the spiking neuron apparatus is configured to encode sensory input comprising a plurality of views of an object, the apparatus comprising a plurality of computer-readable instructions.

In a variant the plurality of instructions are configured to, when executed: (i) encode individual ones of the plurality of views into a spike output by a plurality of first layer neurons, (ii) provide the spike output to a second layer neuron via a plurality of connections associated with individual ones of the plurality of first layer neurons, (iii) based on a response generated by the neuron: (a) depress a first connection of the plurality of connections and (b) potentiate a second connection of the plurality of connections. The first connection is configured to provide a portion of the spike output to the neuron within first time interval prior to the response. The second connection configured to provide a portion of the spike output to the neuron within second time interval after the response.

In a third aspect of the disclosure, a method of updating a connection providing stimulus to an artificial spiking neuron is disclosed. In one embodiment, the method includes: (i) depressing the connection when the stimulus is within first time interval from a response, and (ii) potentiating the connection when the stimulus is outside the first time interval from the response.

In a variant, the depression and the potentiation are based on the response.

In a fourth aspect of the disclosure, a non-transitory computer-readable apparatus configured to store one or more processes thereon is disclosed. In one embodiment, the one or more processes include a plurality of instructions. In a variant, the plurality of instructions are configured to, when executed: (i) send an encoded digital signal to a neuron via one or more connections, (ii) receive a response from the neuron, (iii) using the response, determine a first and second interval, (iv) demote a first connection of the one or more connections during the first interval, and (v) promote a second connection of the one or more connection during the second interval. The encoded digital signal is configured based on one or more transformations of an object in a sequence of frames.

In a fifth aspect of the disclosure, a neuron network is disclosed. In an embodiment, the neuron network is configured to, inter alia, provide updates based on bi-modal plasticity rule.

In a sixth aspect of the disclosure, a non-transitory computer readable medium is disclosed. In an embodiment, the medium is configured to store instructions configured to, inter cilia, generate output based on a series of frames corresponding to an object.

In a seventh aspect of the disclosure, a method of object detection is disclosed. In an embodiment, the method includes, inter alia, preventing a feedback loop to facilitate network normalization.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 11A is a block diagram illustrating a computerized system useful with a temporally proximate feature encoding mechanism in accordance with one implementation of the disclosure.

Figure 1:
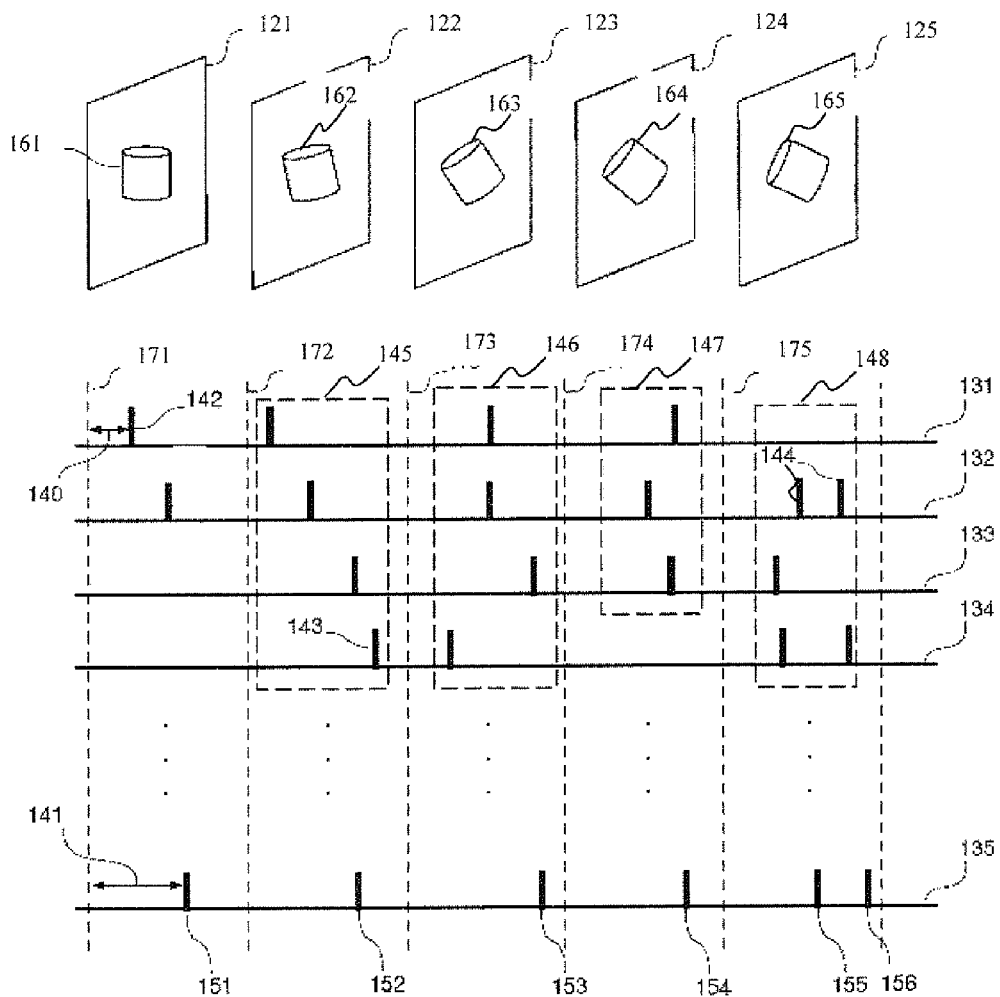
FIG. 1 is a graphical representation illustrating encoding of an input signal into a pattern of pulses, and a sample response of the detector node, according to one exemplary embodiment.

All Figures disclosed herein are CD Copyright 2013 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the tem' "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, in one salient aspect, apparatus and methods for implementing mechanism for encoding of consistent (e.g., temporally proximate) feature representations in sensory input. The sensory input may comprise, for example, an audio signal, a stream of video frames, and/or other input. In some implementations, such as described with respect to FIG. 1 below) may comprise image frames received from an image sensor (such as a charge-coupled device (CCD), CMOS device, and/or an active-pixel sensor (APS), photodiode arrays, etc.). In one or more implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

Referring now to FIG. 1, one implementation of temporally proximate object encoding methodology is described in detail. In FIG. 1, the input signal may comprise a sequence of frames 121-125. The encoding apparatus may transform (encode) the input signal into an encoded signal. In one or more implementations, the encoded signal may comprise a plurality (also referred to as a group) of pulses. Individual pulses within the pulse group, may last, in some implementations, on the order of 1-2 ms and are approximated by discrete temporal events. In some implementations, an individual pulse of the pulse group may be composed of several individual spikes.

Individual the frames 121-125 may be encoded into a respective group of pulses (e.g., pulse groups 146, 147 corresponding to the frames 123, 124, respectively, in FIG. 1). The encoded pulses 142-144 may be transmitted along respective communication channels 131-134 using e.g., any of the mechanisms described below, e.g., connections 406, 416, 426 in FIG. 4A.

Latency of encoded pulses illustrated in FIG. 1 may be determined based on a temporal delay between a reference event and an arrival of the pulse along a channel (e.g., line 140 denotes the latency of pulse 142 corresponding to the frame 121 in FIG. 1). Pulse latency may be measured with respect to the corresponding frame, as denoted by vertical broken lines 171-175.

For example, latency for individual pulses within the pulse group 147 may be configured with respect to the onset of the frame 174. In one or more implementations (not shown), an event trigger, such as sudden change in the visual signal (e.g., due to a visual saccade or a sudden movement of the image camera, movement of parts of the visual signal, appearance or disappearance of an object in the visual scene), or alternatively a clock signal may be used as the temporal reference.

Individual frames 121-125 in FIG. 1 may contain a representation of an object (an upright cup 161 and rotated cups 162-165) that is undergoing a rotational transformation. Other transformations, such as translation, scaling, lighting, transparency, color changes, and/or a combination thereof are equally compatible with the invention, provided the transformations occur slowly, compared to the frame rate, and sequential phases (views) of the object transformation appear in a temporal proximity in the captured frames, as illustrated in the frames 121-125 of FIG. 1.

The term "temporal proximity" is used in the present context to describe object representations (views) that appear within a sequence of input frames taken over a period of time commensurate with the object transformation time scale. The exact duration of this interval may be application-specific. For example, implementations of the object recognition apparatus configured to process visual signals containing one or more people, it may be useful if object transformation lasts for about 2-7 frames (or for a period of 40-300 ms) in order for the detection apparatus to capture sufficient information related to the object. It will be appreciated by those skilled in the art that the above parameters are exemplary, and other applications (e.g., radar images of air/space craft or projectiles, tomographic images of human body and organs, visual and radio-frequency images of celestial objects, sonar images of underwater vehicles, etc.) each impose different requirements and/or bounds on the timing of object transformation persistence.

In some implementations (such as illustrated in FIG. 1), the image-to-pulse encoding is configured to produce different patterns of pulses in response to different representation of the same object, as illustrated by the pulse groups corresponding to objects representations 161-165 in the frames 121-125. Even relatively similar object representations, such as cups 164, 165 of close orientation, may be encoded into two distinct pulse patterns, as illustrated by the pulse groups 147, 148 in FIG. 1. The encoding producing the distinct pulse groups 147, 148 may enable detection of minute distinctions between the content of frames 124-124.

In some implementations (not shown), two different objects (or the same object with different parameters) may be encoded into the same pattern of pulses, in which case internal representation invariance is a property of the encoder. A detector that receives such patterns may inherit that particular invariance. For example, contrast and/or color information may be lost in the encoding stage, in which case the object detection apparatus may respond invariantly to frames of different contrast and/or color.

Returning to FIG. 1, a detector (for example, the neuron detector 430 of FIG. 4A) may receive the one or more pulses of the pulse group (such as 145-148). The detector may generate a detection signal (pulses 151-156) in response to pulse group that may contain the predetermined pattern of pulses corresponding to the object of interest.

As the detector receives the input pulses, it makes a determination whether or not to "fire" a detection signal. In one variant, the detector is likely to fire when input pulses arrive fairly synchronously along some subset of input channels. In another variant, the detector is likely to fire if the incoming pattern of pulses exhibits certain inter pulse intervals. In one implementation, the detector logic relies on a continuous nature of the natural world, wherein pulse patterns that are similar and arrive in proximity are very likely to encode the same object. The detector logic adjusts the likelihood of detection signal based on the input/detection history. This is an exemplary adjustment mechanism of the detection apparatus that increases a likelihood of the detector response to a particular object. The detection signals are transmitted from the detector node to downstream nodes along respective downstream transmission channels (such as the channel 135 in FIG. 1).

Such an appearance of consecutive sequence of views in temporal proximity facilitates object identification by the apparatus invariantly to the object transformation. Specifically, the detection apparatus of FIG. 1 recognizes the rotated cup in each of the frames 162-165 as being the same object of interest as in the frame 161, even though the views of the object, and consequently the representations thereof, are different. As it will be appreciated by those skilled in the art that while the exemplary embodiment of FIG. 1 shows different or distinct views of the object transformation within the input frame sequence 161-165, other frame sequence configurations are compatible with the invention (for example, repetitions of the same view for more than one frame, etc.). Such repeated frames none the less allow the detection apparatus to recognize the object invariantly with respect to the transformation, while (in one in some variants) increasing the processing time required for detection.

In the exemplary embodiment shown in FIG. 1, the first frame 121 comprises a default representation of the object (the upright cup 161) that may correspond to the target state of the detector that is configured to recognize the pulse pattern corresponding to that default representation, and to generate the detection signal (a positive response).

In a variant (not shown), the exemplary apparatus of FIG. 1 may not necessarily produce the detection signal when a new object (or objects) first appears in the input signal, If the first input pattern of pulses corresponds to the target state (for example the upright cup), the detector generates the detection signal. When, however, the detector receives an input pulse pattern corresponding to a different object representation (such as an upside down cup), it may not recognize it based on the pulse group of one such frame alone. However, receipt of subsequent pulse groups corresponding to the upside down cup (over many frames) by the detector causes the detector to recognize the upside down object representation (even in representations that were previously not recognized) due to the temporal proximity-based adjustment mechanism described below in further detail.

Once the object representation is identified (recognized) by the detector (via matching the corresponding pulse pattern), or the detector collects additional information indicating that the input represents an object of interest, the sensitivity of the detector is in one embodiment adjusted (increased), so that the detector node becomes more sensitive to that specific object representation, and is more likely to recognize that specific object in the subsequent pulse groups.

In one or more implementations, the detector may be configured to generate detection signal only after receiving the whole input pulse group, as illustrated by the detection signals 153 corresponding to the pulse group 146.

In some embodiments, the detector is configured to respond to an input pattern even before all of the input pulses arrive at the detector, as illustrated by the detection signal 152 corresponding to the pulse group 145 in FIG. 1. In the illustrated embodiment, the detection signal 152 is generated before the last pulse of the pulse group has arrived at the detector (such as pulse 143 of pulse group 145 propagating on the channel 134). Under this approach, the leading portion (also referred to as the "prefix") of the pulse group 145 is sufficient to trigger the detection logic of the detector such that subsequent pulses are not necessary to perform recognition. It also enables the detection apparatus to report object detection sooner. In one configuration, the remaining input pulses may be used to trigger additional detection pulses, and contribute to detector excitability adjustment.

In one or more variants, the encoder may be configured to generate two or more pulses for one or more selected transmission channels, as illustrated by the pulses 144 transmitted on the channel 132, corresponding to the input frame 125 in FIG. 1.

In some implementations, the detection signal generated by the receiving unit may contain two or more pulses, as illustrated by pulses 155, 156 corresponding to the same pulse group 148 and frame 125 in FIG. 1. In this approach, multiple pulses sent over a particular channel within the same pulse group serve to emphasize the importance of that particular channel for object detection, and to facilitate detection response from the receiving unit. In one or more variants, transmissions of multiple pulses may be used to combat effects of noise, interference and/or intermittent connections during transmission.

In some implementations, the timing of the detection signal (i.e., detection pulse latency) with respect to the arrival of the first input pulse at the detector encodes the level of confidence generated by the detection algorithm that the input pulse group represents the object of interest. In some cases, a delayed response (long latency) may correspond to a low confidence of the detection algorithm. Such delay may be due to, for instance, by performing of additional computations (e.g., additional iterations of the algorithm, etc.) by the detector. A timely detector response (short latency) conversely corresponds to a higher confidence of the detector.

In some variants, such delayed detection signal may be followed by a lower latency ('fast') detection signal that may correspond to a subsequent pulse group that is a better match (closer to the actual target state). In effect, a late-generated detection signal facilitates the detector response to the next frame, and causes a downstream detector to receive two input pulses.

In some implementations, object encoding is implemented using apparatus and methods which are described in a commonly owned and co-pending U.S. patent application Ser. No. 13/152,084 entitled "APPARATUS AND METHODS FOR PULSE-CODE INVARIANT OBJECT RECOGNITION" incorporated by reference, supra, may be utilized. This approach encodes an object into a group of pulses such that an identity (or type) of each object is encoded into relative (to one another) pulse latencies and parameters of the object, such as scale, position, rotation, are encoded into the group delay (that is common to all pulses within the group) of the pulse group. This encoding approach enables object recognition that is invariant to object parameters, such as scale, position, rotation, hence advantageously simplifying the object detection apparatus.

Figure 2:
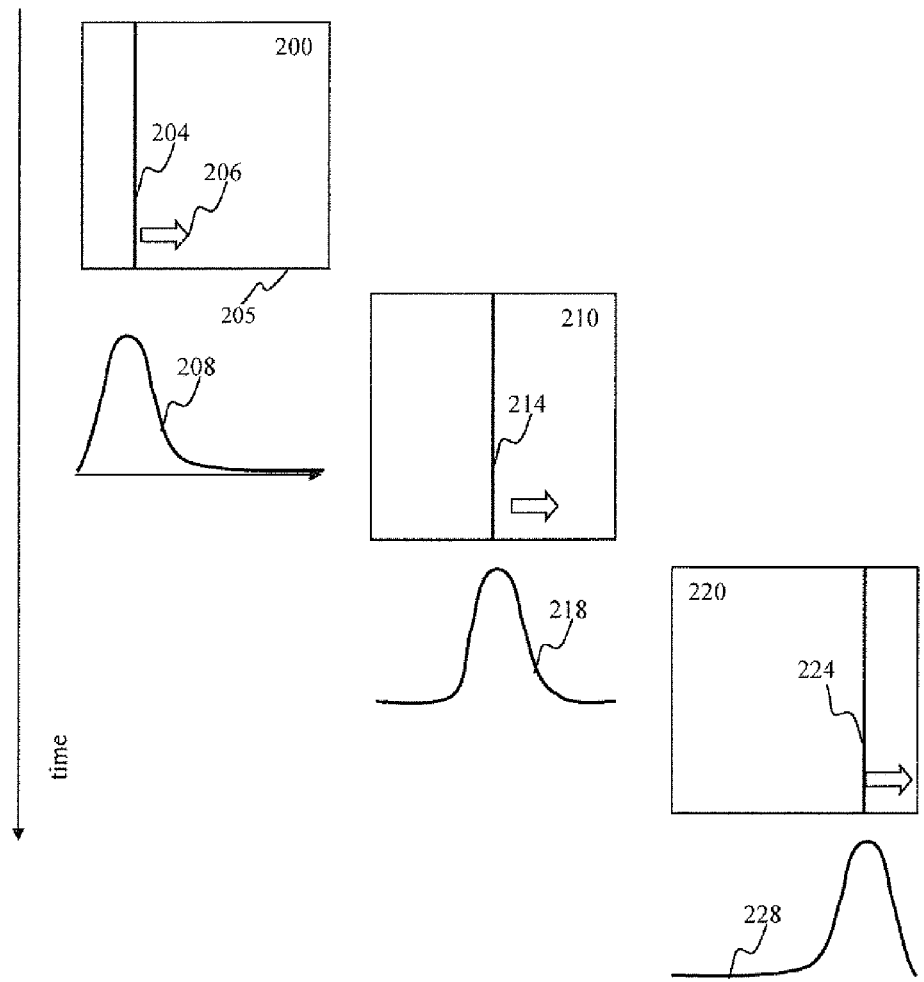
FIG. 2 is a graphical illustration depicting temporally consistent object present in an input to spiking signal processing apparatus, according to one or more implementations.

FIG. 2 illustrates frames 200, 210, 220 comprising temporally proximate representations 204, 214, 224 of a vertical bar that is moving horizontally to the right through the frame. Frames 200, 210, 220 may be encoded in to spike signal by, for example, a spiking neuron network 400 of FIG. 4A and/or a sensory processing apparatus 1000 of FIG. 9A, described in detail below. Individual neurons of the network 400 (e.g., the neurons 404, 414, 424) may be characterized by receptive fields, characterizing sensitivity of neuron to input signal as a function of horizontal frame extent (e.g., 205 in FIG. 2). Varying spatial sensitivities for receptive fields may be utilized when encoding sensory input, such as for example, Gaussian, box cart, triangular, raised cosine and/or other dependencies. One implementation of such receptive fields is depicted in FIG. 2 by curves 208, 218, 228, respectively. As the bar moves across the frame horizontal extent 205, successive neurons may become energized due to an overlap between the bar horizontal position (e.g., 204, 214, 224) and the receptive field (208, 218, 228) of the respective neuron. While any individual representation 204, 214, 224 may not be sufficient in order to deduce object nature and/or motion (and hence to detect the object), processing of multiple views comprising temporally proximate representations of the same object may enable object detection. By way of a non-limiting example, detection of the edge 214 in frame 210 may be facilitated by prior knowledge of the position of edge 204 in frame 200. Detection of the edge 224 in frame 220 may be facilitated by prior knowledge of the position of edge 204 in frame 200 and/or edge 214 in frame 210, as described in detail with respect to FIGS. 4A-4B below.

In some implementations, such as those described in detail in U.S. patent application Ser. No. 13/152,105, entitled "APPARATUS AND METHODS FOR TEMPORALLY PROXIMATE OBJECT RECOGNITION", filed Jun. 2, 2011, spiking neuron networks may employ an inhibition mechanism in order to increase competition between neurons and to produce a variety of receptive fields responding to individual objects.

A wide variety of competition mechanisms may be implemented with the present disclosure. For example, one approach, commonly referred to as the "winner take all" (WTA), may allow a single detector (for example neuron 135 of FIG. 1) to report detection of the specific object. This is achieved by, inter alia, the sending of a control (inhibition) signal from the detector (the neuron node that is the first to detect the object) to other detectors to delay and/or prevent detection signal generation by the other detectors.

Another approach, commonly referred to as the "hard" inhibition, impedes object detection by one group of the detectors while leaving the remaining detectors unaffected.

An approach, referred to as the "soft" inhibition, may be used to impede object detection by the other detectors while still allowing generation of the detection signals. In one implementation, such inhibition is effected via an increase of the detection threshold of the second nodes. In another implementation, an additional delay is used to delay detection signal output from the secondary nodes. In the latter case, it is possible that two or more detector nodes report the same object of interest. However, the responses by the secondary nodes are delayed with respect to the primary node response. In still another variant, node inhibition is configured to reduce the magnitude of the detection pulse generated by the secondary node. A combination of the above and or similar approaches may also be implemented consistent with the principles and architectures described herein.

In one implementation of the invention, the inhibition remains in effect until the arrival of the next pulse group (frame). In some implementations, the nodes may remain inhibited for more than one frame. It is appreciated by those skilled in the art that many other inhibition schemes may be implemented with the present disclosure, such as a combination of hard/soft inhibition rules configured over varying time periods (for example, some nodes are soft inhibited over a first number of frames, while other nodes are hard inhibited over a second number of frames). In one variant, inhibition of one detector (for example, detector 355 in FIG. 3) by another detector (for example, detector 356 in FIG. 3) is configured to diminish exponentially over time. Such inhibition configuration allows the detector 355 to respond to a particular object once the inhibition signal drops below a certain threshold. The inhibition level is maintained above the threshold by periodic transmissions of the inhibition signal by the inhibitory detector.

In one or more implementations, shown and described with respect to FIG. 3 below, a detector that may be delayed (and/or inhibited) to respond to representations of a first object, may responds to views of other objects. For example, consider an input sequence of frames containing representations of object A (e.g., a cup on FIG. 3), frequently followed by representations of object B (not shown). A detector (such as, for example, the detector 335 in FIG. 3) that may detects input pattern relating to object A may also learns to detect object B by mechanisms above. The input frame sequence further contains representations of objects C, D, E, F, and G, which may not detected by the detector 335 (for example, due to having a less pronounced temporal structure compared to the representations of objects A and B). However, a second detector (such as, for example, the detector 336 in FIG. 3) that may be inhibited by the detector 335 from responding to representations of objects A and B may be adjusted to respond to the representation of object C (e.g., the puzzle piece in FIG. 3).

In some implementations, multiple node inhibition may be combined with the long-term modulation of transmission channels, described for example in U.S. patent application Ser. No. 13/152,105, entitled "APPARATUS AND METHODS FOR TEMPORALLY PROXIMATE OBJECT RECOGNITION", filed Jun. 2, 2011, incorporated supra. This approach may advantageously allow adjustment of dynamic parameters (gain, transmission delay, detection pulse amplitude and timing, etc.) of individual detectors and transmission channels given the appropriate input frames (also referred to as the "training" input or cycle). Upon performing a training cycle, the object detection apparatus becomes responsive to a certain set of objects, each response being invariant to temporally proximate views of the objects.

Figure 3:
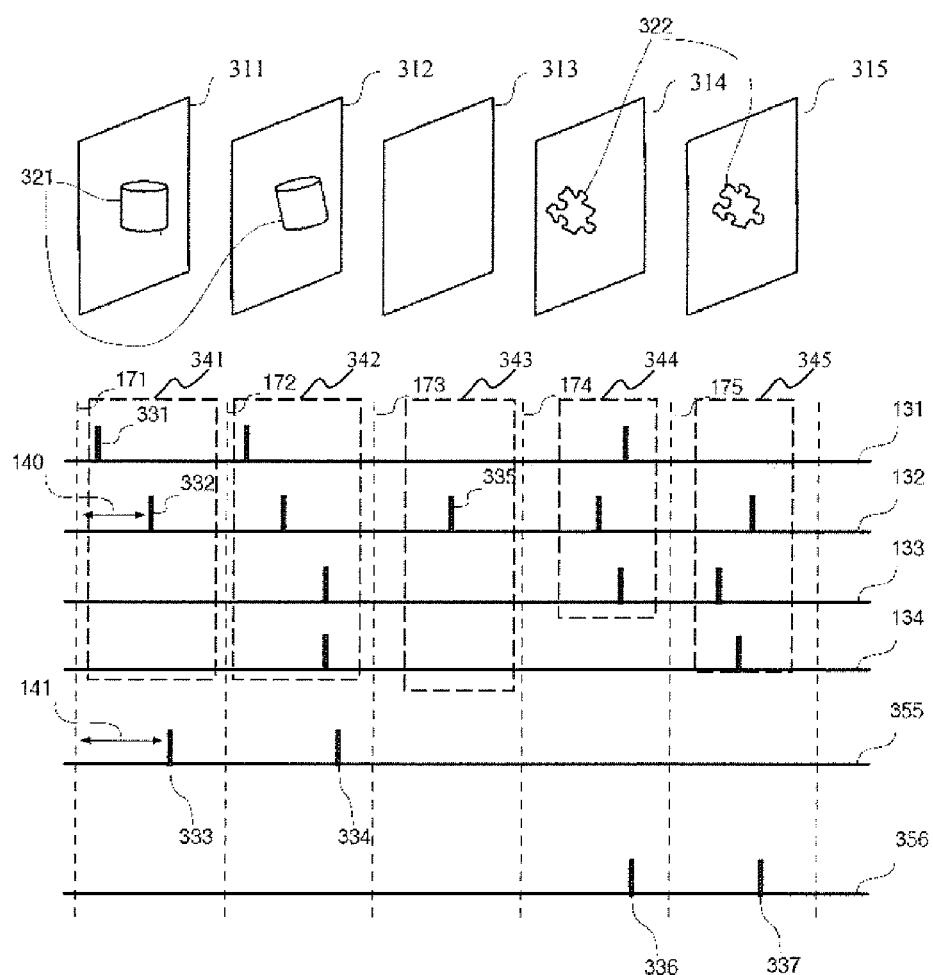
FIG. 3 is a graphical illustration depicting mutual inhibition between two detector nodes in response to a signal representative of different objects according to one or more implementations.

Referring now to FIG. 3, an exemplary implementation of multiple object recognition apparatus utilizing hard mutual inhibition is depicted. The recognition apparatus may be configured to receive a sequence of input frames 311-315. Some of the input frames (311-312, 314-315) may contain representations of one of two objects (321, 322) separated by one or more frames (such as the frame 313, also referred to as the blank frame) where there the objects 321, 322 are not present. Such situations may occur in the physical world where objects do not suddenly change into one another, instead appearing consecutively in series of consecutive frames interleaved by blank frames. Although a single blank frame 313 is shown in FIG. 3, several blank frames may be present in the input sequence of frames. Furthermore, in one variant (not shown), blank frames contain representations of objects other than the objects 321, 322.

The temporal separation of objects as shown in FIG. 3 may allow the apparatus to distinguish between different objects and to report the detection via different detectors. In such case, the increased excitability of detector 355 which responds to the first object 321 decays over the duration of the blank frame 313 (or a plurality of blank frames in general) and by the time the second object 322 appears in frame 314, it is less likely to be confused with the first object 321 by, for example, the detector 355. As a result, the detector 356 has an opportunity to respond to the second object 322. In a situation when representations of two objects frequently and abruptly change into one another (a rare situation in the real world scenes), the detection apparatus respond to both object representations as though it is a single object. In real world scenes, objects typically do not change into each other so abruptly. However, representations of the same object with respect to some transformation (e.g., rotation or scaling) do and this property of input statistics is used by the apparatus to develop an invariant representation.

As shown in FIG. 3, the objects 321, 322 are being subjected to a rotational transformation. It is appreciated by those skilled in the art that a variety of other transformations are useable and compatible with the present invention, such as was described with respect to FIG. 1.

The detection apparatus of FIG. 3 may comprise an encoder module configured to encode each of the input frames 311-315 into a respective pattern (group) of pulses 341-345 that propagate along the transmission channels 131-134. The recognition apparatus of FIG. 3 may comprise two (or more) detectors whose activity is depicted by the traces 355, 356, respectively. The detector response trace 355 contains the detection pulses 333, 334 generated in response to receiving the pulse patterns 341, 342, indicating the presence of the object 321 in the frames 301, 302. The frame 312 may contain a weak representation of the object 321, such as the object moving out of the sensing field or fading away. In some implementations, the detector 355 is configured without learning functionality and it, therefore, does not respond to the pulse pattern 342, because the weaker input is not sufficient to move the detector state sufficiently towards the target set (firing set) S.

In one or more implementations, the state $e_1$ of the detector 335 may be adjusted in accordance with:

$$\frac{de_1}{dt} = -\frac{e_1}{\tau}, \quad \text{(Eqn. 1)}$$

to increase detector excitability upon generation of the detection signal 333 in response to the pulse group 341. The adjustment of Eqn. 1 may moves the detector state closer to the target state prior to receipt of the subsequent pulse group 343. Higher detector excitability aids the detector 355 in recognizing the object of interest in the pulse pattern 342, and to cause generation of the detection pulse 334.

The detector apparatus FIG. 3 may comprise mutual detector inhibition, as illustrated by the detector response traces 355, 356. As the detector 355 produces detection pulses 333, 334, it prevents the detector 356 from detecting the same object by transmitting an inhibition signal (not shown). This approach advantageously ensures that only a single detector (for example, the detector 355) produces detection output for the specific object (for example, 321).

The blank frame 313 may not trigger a detection signal generation by either detector 355, 356 as the frame 313 contains no relevant object representations. The increased susceptibility of the detector node 355 diminishes subsequent to the frame 313.

The frames 314, 315 in FIG. 3 contain representations of another object (322), which the detector 356 is configured to recognize. Likewise to the description with respect to the object 321, supra, the detector 356 is configured inhibit responses of the detector 355 as indicated by the absence of the detection pulses in the trace 355 (which correspond to the detection pulses 336, 337 generated in response to the frames 314, 315). Such "selective filtering" significantly simplifies operation of downstream detectors (not shown), which no longer need to deal with weaker and/or late detection responses. Such responses may be produced by the detector 355 in response to the frames 314, 315, or by the detector 356 in response to the frames 311, 312.

Figure 4A:
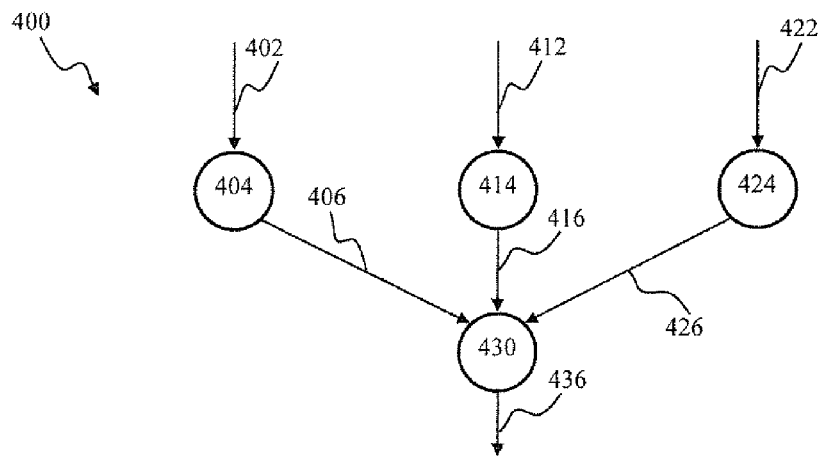
FIG. 4A is a graphical illustration depicting a spiking neuron network operatively configured for a temporally proximate object encoding mechanism in accordance with one implementation of the disclosure.
Figure 4B:
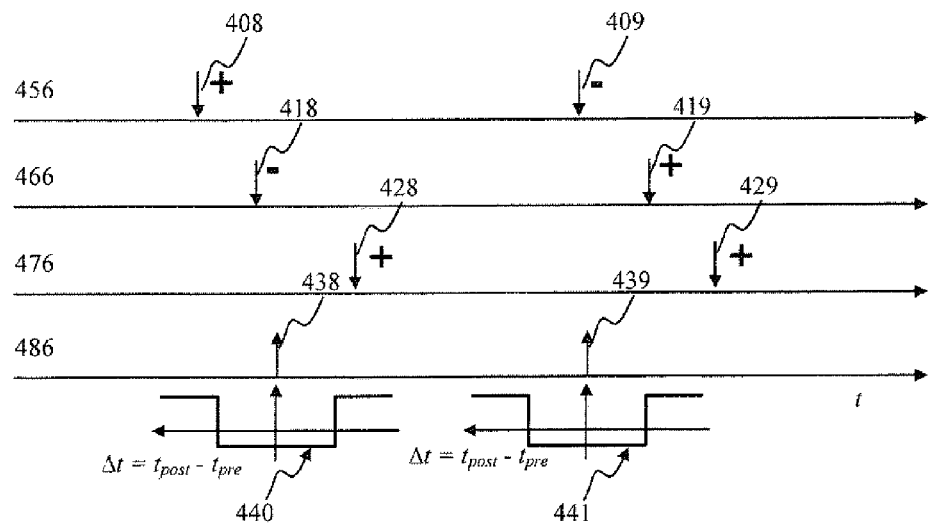
FIG. 4B is a timing diagram illustrating operation of the spiking neuron network of FIG. 4A comprising bi-modal plasticity rule, according to one or more implementations.

FIGS. 4A-4B illustrate a spiking network operative to detect an object in a sequence of object views (e.g., temporally proximate object representations). As used herein, the temporally proximate object representation is used to describe object representation (e.g., an image, a trace, a contour of an object in a visual sensory input) that occur in close proximity (in time) to one another. The term "close proximity" may be utilized to describe temporal frame acquisition scales where an object is present in at least two frames. The present disclosure is not limited to processing of visual input. It will be appreciated by those skilled in the arts, that signals of other sensory modalities (e.g., touch, audio) and/or other origin (e.g., radio frequency waves) may be used with the methodology of the disclosure.

FIG. 4A illustrates one or more implementations of a spiking neuron network useful with temporally proximate object encoding mechanism. The network 400 may comprise a plurality of encoder neurons 404, 414, 424 (also referred to as the input layer neurons) that may be configured to receive sensory input 402, 412, 422. In some implementations, the sensory input 402, 412, 422 may correspond to frames 200, 210, 220 of FIG. 2, comprising representations of an object (e.g., the vertical bar in FIG. 2).

The neurons 404, 414, 424 may be configured to encode the sensory input 402, 412, 422 into spike output. In one or more implementations, individual encoder neurons (e.g., 404, 414, 424) may be configured to encode different representations of the same object into one or more pulses. The object representation may correspond to a view (e.g., 122 in FIG. 1) that may be encoded in to a pattern of pulses (e.g., 145 in FIG. 1).

In cases where the sensory input comprises one or more image frames, an image parameter (e.g., luminance L) may be encoded into spike latency $\Delta t_i$ based on a logarithm of a function g( ) of the difference between the parameter value $L_i$ associated with individual pixels within the frame and a reference parameter (e.g., a n average frame luminance $L_{ref}$):

$$\Delta t_i \propto C - \log(g(L_i - L_{ref})). \quad \text{(Eqn. 2)}$$

where C is an offset. In some implementations, the function g( ) may comprise a rectified generator function (e.g., a low-pass filter) such as that described, for example, in co-owned and co-pending U.S. patent application Ser. No. 12/869,583, entitled "INVARIANT PULSE LATENCY CODING SYSTEMS AND METHODS", filed Aug. 26, 2010, incorporated herein by reference in its entirety.

Spiking output of the encoder layer neurons 404, 414, 424 may be communicated to a detection layer neurons (e.g., the neuron 430 in FIG. 4A) via one or more connections (e.g., the connections 406, 416, 426 in FIG. 4A). The detector neurons may be configured to respond to one or more features present in the spike output of the encoder layer neurons (e.g., a pulse group corresponding to vertical and/or a horizontal edge, an object of a certain color, and/or other feature). The detector neuron may be configured to generate a detection signal (e.g., a spike) indicative of the presence of one or more features in the spike signal provided by the encoder layer neurons. Output of the detector neuron (e.g., 430 in FIG. 4A) may be communicated via a connection (e.g., 436 in FIG. 4A) to another network entity (e.g., a detector neuron of another layer configured, for example, to detect complex features (a corner comprising an intersection of two or more edges)), and/or other targets.

Individual connections (e.g., 406, 416, 426 in FIG. 4A) may be assigned, inter alia, a connection efficacy, which in general may refer to a magnitude and/or probability of input spike influence on neuron output response (i.e., output spike generation/firing). The connection efficacy may comprise, for example a parameter—e.g., synaptic weight—by which one or more state variables of post-synaptic neuron may be changed. In one or more implementations, the efficacy may comprise a latency parameter characterizing spike propagation delay from a pre-synaptic neuron to a post-synaptic neuron. In some implementations, greater efficacy may correspond to a shorter latency.

In accordance with one or more implementations, efficacy of connections delivering encoded spiking input into the detector neuron may be manipulated in accordance with a bi-modal and/or single-modal spike timing based plasticity mechanism as described with respect to FIGS. 4B-5E, below.

FIG. 4B illustrates a timing diagram depicting bi-modal plasticity rule for use with the temporally proximate object encoding mechanism of the network of FIG. 4A.

The traces 456, 466, 476, 486 depict exemplary activity of output connections 406, 416, 426, 436 of neurons the neurons 404, 414, 424, 434 of FIG. 4A, respectively. The curves 440, 441 denote bi-modal spike timing dependent plasticity (STDP) rules used to operate connections 406, 416, 426. In one or more implementations, bi-modal STDP rules may be configured as illustrated in FIGS. 5A-5D and described below.

Returning now to FIG. 4B, spikes 408, 418, 428 on traces 456, 456, 476, respectively, may denote representations of an object corresponding to three frames of sensory input (e.g., the frames 200, 210, 220 of FIG. 2) encoded by the neurons 404, 414, 424 and delivered to the neuron 430 of FIG. 4A.

Spike 438 in FIG. 4B may denote an output spike generated by the neuron 430 based on the receipt of, for example, input spikes 408, 418. The spike 428 may arrive at the neuron 420 subsequent to the response 438.

In accordance with the STDP rule 440, connections that provide input into the neuron that is near-contemporaneous (e.g., within a certain time range) from the neuron response (e.g., 438 in FIG. 4B) may be depressed, as depicted by the '−' sign near the spike 418 in FIG. 4B for the connection 416. In one or more implementations, the near-contemporaneous input may correspond to the input associated with the current frame (e.g., 210 in FIG. 2) being processed. In accordance with the STDP rule 440, connections that provide input into the neuron that closely precedes and/or follows the neuron response 438 (e.g., outside the time range) may be potentiated, as depicted by the '+' sign near spikes 408, 428 in FIG. 413 corresponding to the connections 406, 426, respectively. In one or more implementations, the temporally proximate preceding/following input may correspond to the input associated with the preceding and/or a subsequent frame (e.g., 200, 220 in FIG. 2) being processed.

When processing spikes 409, 419, 429 associated with other input frames of sensory input and encoded by the neurons 404, 414, 424, the neuron 430 may generate response 439 based on the input 409 delivered via the connection 406. This may be due to, at least partly, greater efficacy of the connection 406 due to the potentiation via bi-modal plasticity described above. In accordance with the STDP rule 441, connections that provide input into the neuron 430 that is near-contemporaneous (e.g., within a defined time range) from the neuron response (e.g., 439 in FIG. 4B) may be depressed, as depicted by the '−' sign near the spike 409 in FIG. 4B for the connection 406. Connections that provide input into the neuron 430 that closely precedes and/or follows the neuron response 439 (e.g., outside the defined time range) may be potentiated, as depicted by the '+' sign near spikes 419, 429 in FIG. 413 corresponding to the connections 416, 426, respectively.

Figure 5A:
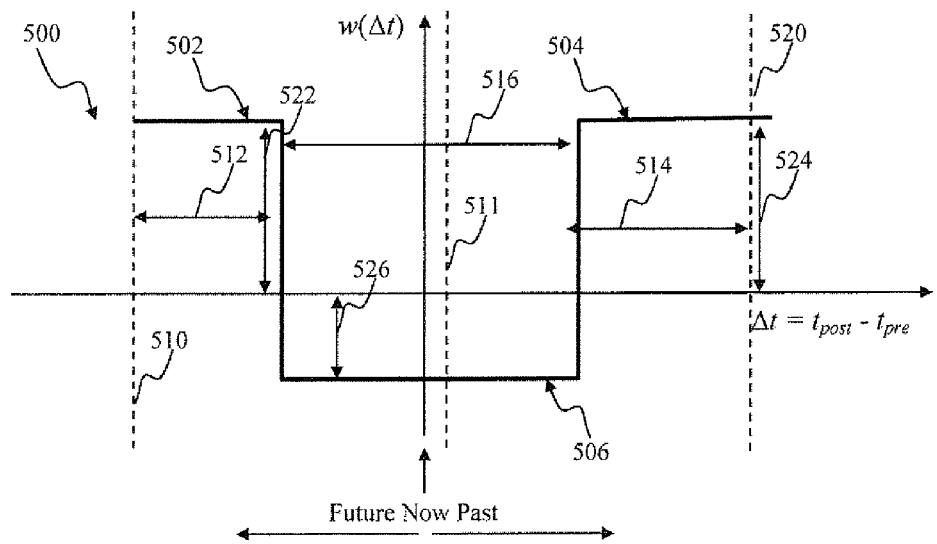
FIG. 5A is a plot depicting a bi-modal plasticity rule, configured for the temporally proximate object encoding mechanism of the network of FIG. 4A, according to one or more implementations.

FIGS. 5A-5E illustrate various implementations of plasticity rules configured for learning temporally proximate patterns in sensory inputs. FIG. 5A presents a bi-modal STDP rule 500 comprising a depression portion 506 and potentiation portions 502, 504, plotted as a function of a time interval between the post-synaptic response and pre-synaptic input: $\Delta t = t_{post} - t_{pre}$. The time interval $\Delta t=0$ corresponds to time of the post-synaptic response. Broken vertical lines 510, 511, 520 in FIG. 5A denote time boundaries of successive frames (e.g., the frames 200, 210, 220 in FIG. 2) that may correspond to the pre-synaptic input into the neuron (e.g., the input 408, 418, 428 into the neuron 430 FIG. 4B). As shown in FIG. 5A, the depression portion 506 may be characterized by depression magnitude 526 and width 516. The potentiation portions 502, 504 are characterized by potentiation magnitudes 522, 524 and widths 512, 514, respectively. It is noteworthy that as the depression portion 506 encompasses $\Delta t=0$, the rule 500 provides both potentiation and depression of a synapse providing input prior to the response ('past' region $\Delta t>0$); and/or a synapse providing input subsequent to the response ('future' region $\Delta t<0$).

Magnitudes of the plasticity rule 500 may be normalized (for example, between 0 and 1 and/or between −1 and 1). In one or more implementations, for values of the potentiation magnitudes 522, 524 of 1, the depression magnitude 526 may be configured between [−1, 0].

The time scales of the plasticity rule 500 (e.g., the intervals 512, 514, 516) may be configured in accordance with the specific requirement of a particular application. By way of non-limiting example, when processing sequence of frames, individual intervals 512, 514, 516 may be set equal to the frame duration (e. g, to 40 ms for a frame rate of 25 frames per second (fps)). In some implementations, the duration of depression window may be set between 1 and 100 ms. The duration of a potentiation window may be set to be 1 to 100 times longer than that of the depression window. In one or more implementations, the width of the potentiation portions may be configured between 5 ms and 1000 ms.

Figure 5B:
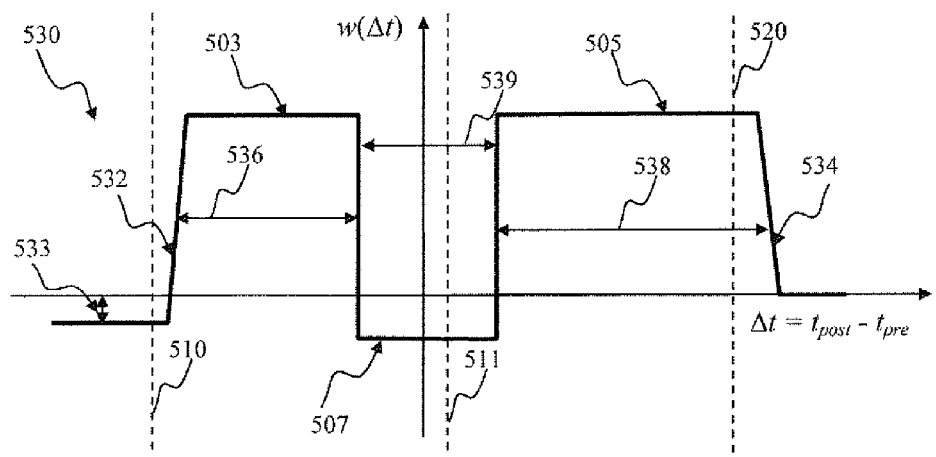
FIG. 5B is a plot depicting an end-bounded bi-modal plasticity rule, configured for the temporally proximate object encoding mechanism of the network of FIG. 4A, according to one or more implementations.

FIG. 5B illustrates a bounded implementation of a bi-modal STDP rule 530 comprising a depression portion 507 and potentiating portions 503, 505. As shown in FIG. 5A, the depression portion 507 is characterized by the width 539, and the potentiation portions 503, 505 are characterized by the widths 536, 538, respectively. The potentiation portions 503, 505 of the rule 530 are time bounded. That is, the potentiation level transitions to zero (within, for example, a region 534 in FIG. 5B) and/or to a value 533 that is close to zero (within, for example, a region 532 in FIG. 5B). In some implementations, the value 533 may be selected at in the range between −0.3 and 0.3, and the width of potentiation portions 536, 538 may be configured between 5 ins and 1000 ms. The width of the transition intervals may be configured between 0 ms and 500 ms based upon the width of the potentiation portions. Broken vertical lines 510, 511, 520 in FIG. 5A denote the time boundaries of successive frames (e.g., the frames 200, 210, 220 in FIG. 2), which may correspond to the pre-synaptic input into the neuron (e.g., the input 408, 418, 428 into the neuron 430 FIG. 4B).

Figure 5C:
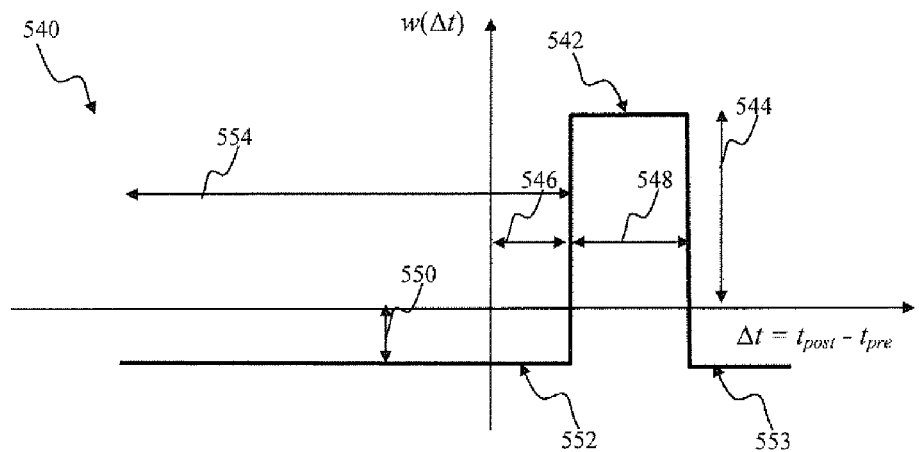
FIG. 5C is a plot depicting single-sided plasticity rule, comprising pre-synaptic potentiation configured for the temporally proximate object encoding mechanism of the network of FIG. 4A, according to one or more implementations.
Figure 5D:
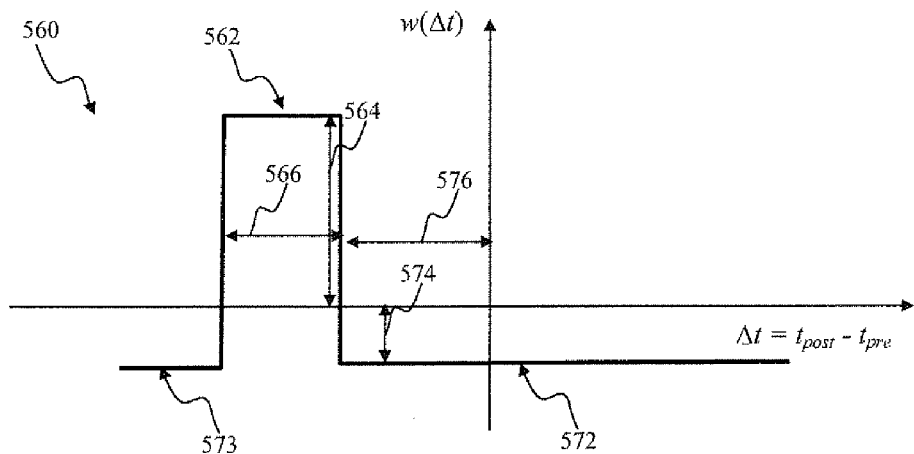
FIG. 5D is a plot depicting single-sided plasticity rule, comprising post-synaptic potentiation configured for the temporally proximate object encoding mechanism of the network of FIG. 4A, according to one or more implementations.

FIGS. 5C-D present single-sided bi-modal STDP rules 540, 560 comprising a potentiation portion 542, 562 and depression portions 552, 553 and 572, 573, respectively. As shown in FIGS. 5C-D, the potentiation portions 542, 562 are characterized by magnitudes 534, 564, respectively.

The widths of the potentiation portions 536, 566 may be selected in the range between 1 ms and 1000 ms, and the potentiation portions may be spaced from the post-synaptic response time ($\Delta t=0$) by an interval 546, 576. In some implementations, the intervals 546, 576 may be selected between 1 ms and 20 ms. The depression portions 552, 553 and 572, 573 are characterized by magnitudes 550, 574, respectively. In one or more implementations, the potentiation magnitudes 544 564 may be set to a gain of 1 while the depression magnitudes 550 574 may be configured between −1 and 0. The temporal extent of the depression portions (e.g., the extent 554 of the portion 552 of RULE 540) may be configured to extend for a period of one or more frames (5-100 ms in some implementations).

In one or more implementations, single-sided plasticity (e.g., the rules 540, 560 of FIGS. 5C-5D) may be utilized to emphasize temporal proximity of data in preceding frames (rule 530) and/or subsequent frames (e.g., rule 560) with respect to the time of the post-synaptic response. Having the asymmetric potentiation curve allows for the non-potentiation side to be modulated, allowing for greater stability of learning. The non-potentiating side can be configured to be slightly negative and cancel out the potentiation cause by noise in the system, but still allow for potentiation of the strong temporally proximal signal.

It will be appreciated by those skilled in the arts that temporal and magnitude scales described above are used to describe some exemplary implementations (processing of video imagery acquired at 25 fps) and may be adjusted in accordance with a particular application. By way of example, in high speed photography applications (where frame rate may be between 100 and 1000 fps), plasticity temporal scales may be shortened; in underwater and/r geophysical applications where data acquisition rate may be between 0.0 and 10 fps), plasticity temporal scales may be increased.

Figure 5E:
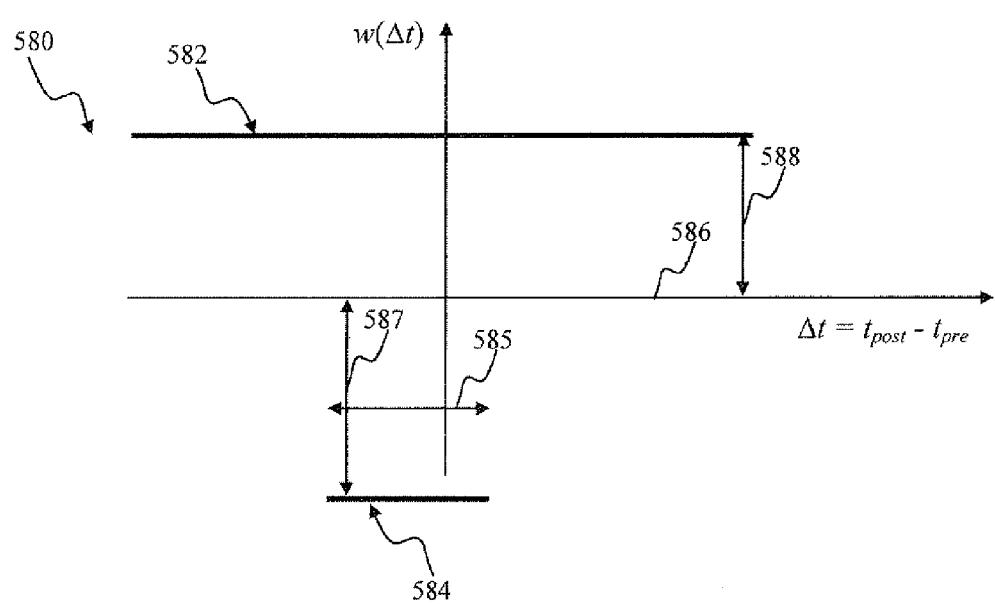
FIG. 5E is a plot depicting bi-modal plasticity rule, comprising a potentiation portion and a depression portion configured for the temporally proximate object encoding mechanism of the network of FIG. 4A, according to one or more implementations.

FIG. 5E illustrates one implementation of bi-modal plasticity rule 580 comprising potentiating portion 582 and an overlapping depression portion 584. Temporal extent 858. The temporal extent 585 may be configured to encompass the Δt=0 point. The plasticity adjustment based on a combination of the rule 582 and 584 may provide both potentiation and depression of a connection for Δt>0 and/or Δt<0. In one or more implementations, magnitude 588 of the potentiation portion 582 may be selected at a gain of 1; magnitude 587 of depression portion may be selected between −2 and −1.

Figure 6:
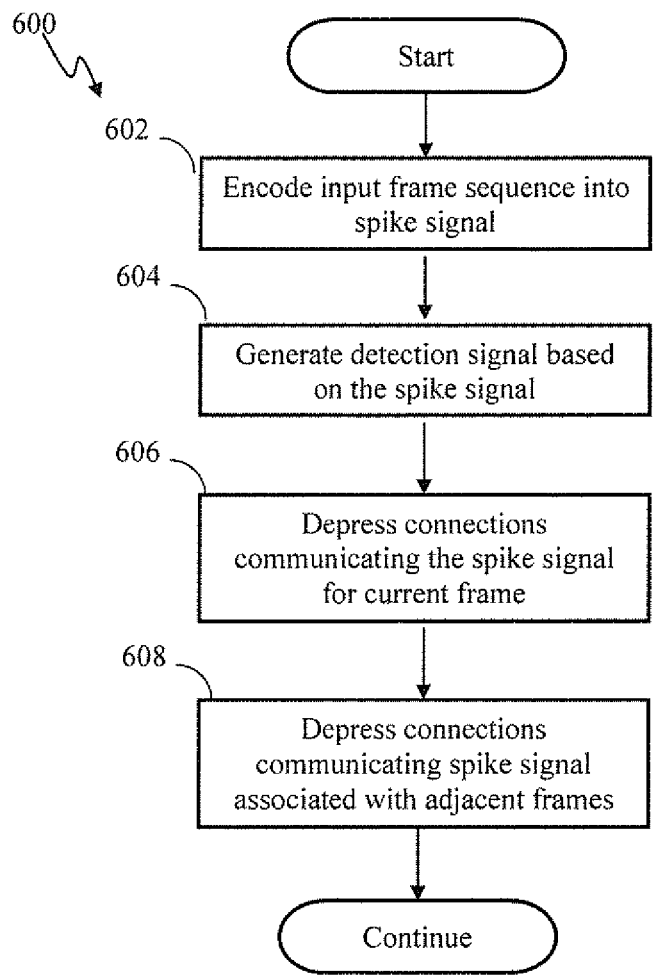
FIG. 6 is a logical flow diagram illustrating a method of encoding visual input comprising temporally proximate representations of an object, in accordance with one or more implementations.
Figure 7:
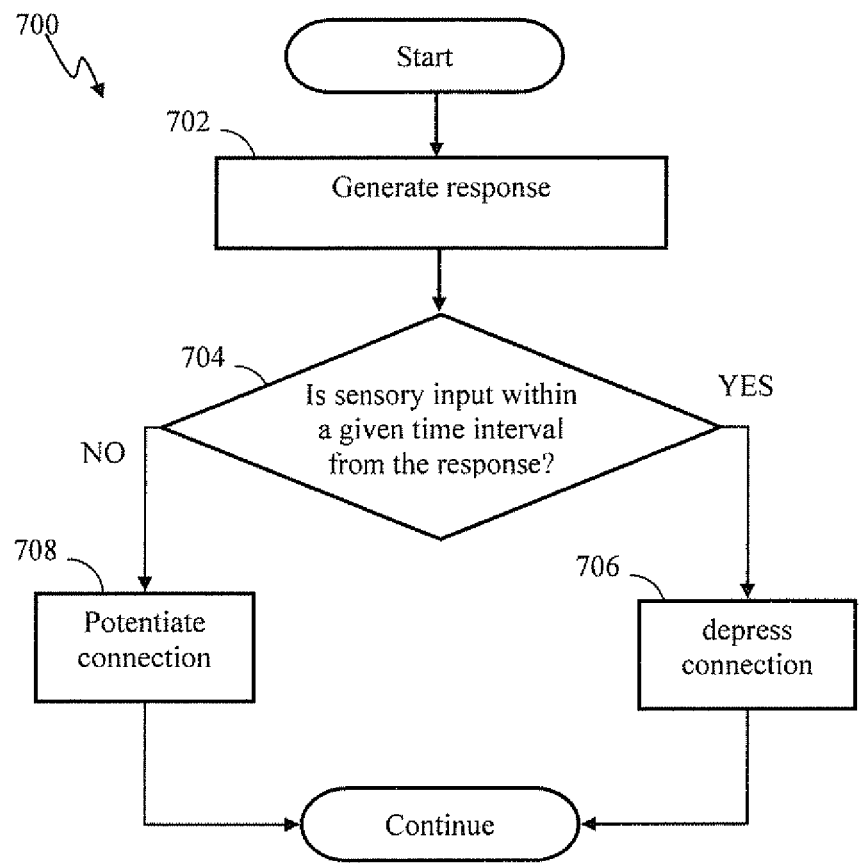
FIG. 7 is a logical flow diagram illustrating a method of operating a spiking network unit with a temporally proximate object encoding mechanism, in accordance with one or more implementations.
Figure 8:
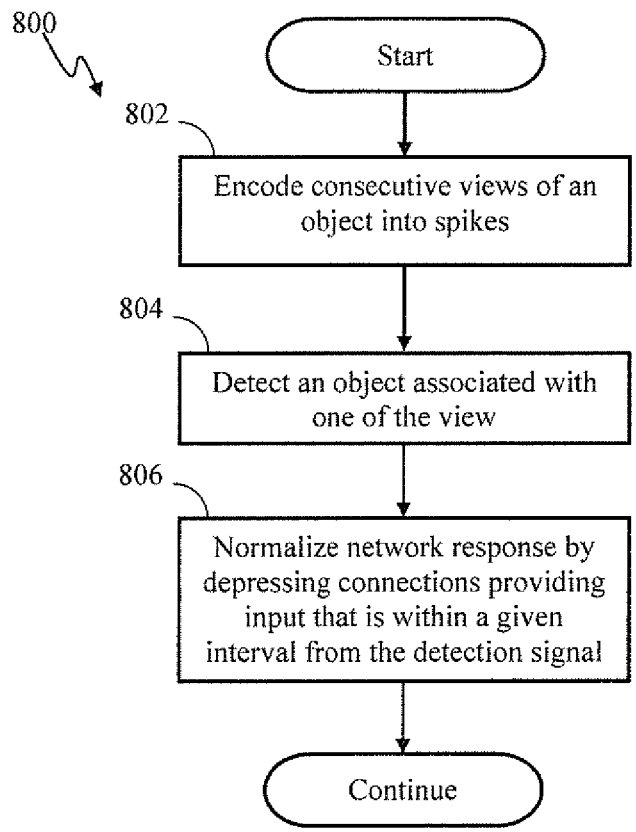
FIG. 8 is a logical flow diagram illustrating a method of detecting temporal proximity in sensory input based on negative reinforcement of early responding neurons, in accordance with one implementation of the disclosure.

FIGS. 6-8 illustrate exemplary methods of using the bi-modal plasticity mechanism for learning temporally proximate representations of objects. In one or more implementations, the operations of methods 600, 700, 800 of FIGS. 6-8, respectively, may be effectuated by a processing apparatus comprising a spiking neuron network such as, for example, the apparatus 1000 of FIG. 9A, described in detail below.

FIG. 6 illustrates a generalized method 600 of operating a sensory data processing apparatus comprising the bi-modal plasticity mechanism. At operation 602 of method 600 of FIG. 6, sensory input may be encoded. In one or more implementations, the sensory input may comprise visual input, such as for example, ambient light 1062 received by a lens 1064 in a visual capturing device 1160 (e.g., telescope, motion or still camera, microscope, portable video recording device, smartphone), illustrated in FIG. 10 below. In some cases, the visual input encoded at operation 602 may comprise for instance an output of an imaging CCD or CMOS/APS array of the device 1080 of FIG. 10. For example, processing apparatus 1070 may be configured for the processing of digitized images (e.g., portable video recording and communications device) as described with respect to FIG. 10, below. The visual input of step 602 may comprise digitized frame pixel values (RGB, CMYK, grayscale) refreshed at a suitable rate. Individual frames may comprise representations of an object that may be moving across field of view (e.g., the frames 200, 210, 220 of FIG. 2). In one or more implementations, the sensory input of operation 602 may comprise other sensory modalities, such as somatosensory and/or olfactory, or yet other types of inputs (e.g., radio frequency waves, ultrasonic waves) as will be recognized by those of ordinary skill given the present disclosure.

Input encoding of operation 602 may be performed using any of applicable methodologies describe herein. In some implementations, the encoding may comprise the latency encoding mechanism described in co-owned and co-pending U.S. patent application Ser. No. 12/869,583, entitled "INVARIANT PULSE LATENCY CODING SYSTEMS AND METHODS", filed Aug. 26, 2010, incorporated supra.

In one or more implementations, representations of the object (views) may be encoded into spike patterns.

The encoded spiking signal may be provided to a detector neuron (e.g., the neuron 430 of FIG. 4B) via one or more connections (e.g., 406, 414, 426 in FIG. 4B). At operation 604, an object representation may be detected by the detector neuron based on the received spike signal corresponding to a current frame (e.g., the spike 418 in FIG. 4B corresponding to the frame 210 of FIG. 2). In some implementations of visual input processing, such as described in co-pending and co-owned U.S. patent application Ser. No. 13/623,820, entitled "APPARATUS AND METHODS FOR ENCODING OF SENSORY DATA USING ARTIFICIAL SPIKING NEURONS", filed Sep. 20, 2012, the detector neuron may generate a response indicative of the detected representation.

At step 606 of method 600, one or more connections that may provide the spiking input associated with the current frame may be depressed. In one or more implementations, the connection may be operable in accordance with bi-modal plasticity rules (e.g., 500, 530, 540, 560, 580 of FIGS. 5A-5E). Connection depression may be effectuated using the depression portion of the bi-modal STDP rule (e.g., the portion 506 of the rule 500 described above).

At step 608 of method 600, one or more connections that may provide portion of the spiking input associated with a prior frame and/or a subsequent frame may be potentiated. The connection potentiation may be effectuated using the potentiation portion of the bi-modal STDP rule (e.g., the portion 502 and/or 504 of the rule 500 described above).

As described above, connection potentiation/depression may refer increase/decrease of connection efficacy. Various efficacy realizations may be utilized with the plasticity mechanism described herein (for example, connection weight, delay, probability of spike transmission, and/or other parameters).

The depression of connections providing input (e.g., a representation of an object) that is near contemporaneous (e.g., within the frame duration) with the neuron post-synaptic response may delay and/or prevent altogether the neuron from responding to that particular frame. In this process, the inputs that made the neuron fire are "discouraged". The potentiation of connections providing input that precedes and/or follows the response by a certain time interval (e.g., a frame duration) may increase the likelihood of a neuron's response to such inputs. Conversely, in this process time-proximate inputs that did not cause the neuron to fire are "encouraged". Such potentiation and/or depression of the connection may enable the neuron to respond to an earlier and/or a later frame that may contain another representation of the same object. In some variants, such mechanism may be utilized to enable the neuron to learn to respond to temporally-proximate views of an object undergoing a transformation (e.g., a rotation). While individual views may differ from one another (e.g., in frames 121 122 in FIG. 1), when a sufficient degree of commonality between the views exist, the plasticity mechanism may bind these views together thereby enabling the neuron to respond to a subsequent vie based on a response to a prior view. When processing visual input from a physical world, objects in a visual scene may persist (e.g., for several seconds or longer). While individual views in individual frames may differ from one another (e.g., in frames 121 122 in FIG. 1), when a sufficient degree of commonality between the views exist, the plasticity mechanism may bind these views together thereby enabling the neuron to respond to a subsequent vie based on a response to a prior view.

Relying on the temporal continuity of spatial transformations of an object may allow a learning system to bind temporally proximal entities into a single object, as opposed to several separate objects. This may reduce memory requirements for storing object data, increase processing speed, and/or improve object detection/recognition accuracy, etc.

In neuroscience applications, learning patterns that are temporally proximal may be used to aid modeling of learning by complex cells of mammalian visual cortex (e.g., cells of V1 area). Learning to detect temporally proximate object representations may enable implementations of models characterizing complex cells in other areas of the cortex (e.g., V2 of visual area, and/or audio).

FIG. 7 illustrates a generalized method 700 of operating a neuron of a spiking neuron network comprising a bi-modal plasticity mechanism, in accordance with one or more implementations. At step 702 of method 700, the neuron generates a response. The response may be based on an spiking input signal (e.g., one or more of the spikes 408, 418, 428 of FIG. 4A) associated with sensory input (e.g., frames 20, 210, 220 of FIG. 2).

At step 704 a determination may be made as to whether the generated response corresponds to an input delivered to the neuron within a configured time interval from the response (e.g., the interval 516 in FIG. 5A). If the sensory input is delivered within the time interval, the method may proceed to 706 where the respective connection (associated with the input delivery) may be potentiated.

When the sensory input is delivered outside the time interval, the method may proceed to 708 where the respective connection (associated with the input delivery) may be depressed.

FIG. 8 illustrates a generalized method 800 of normalizing response of a spiking neuron network configured to process sensory input, in accordance with one or more implementations. At step 802, two or more consecutive views (e.g., views 121, 122, 123, 124 in FIG. 1) of an object may be encoded into spike output.

The encoded spiking signal may be provided to a detector neuron (e.g., the neuron 430 of FIG. 4B) via one or more connections (e.g., 406, 414, 426 in FIG. 4B). At operation 804, an object representation may be detected by the detector neuron based on the received spike signal corresponding to a current frame (e.g., the spike 418 in FIG. 4B corresponding to the frame 210 of FIG. 2). In some implementations of visual input processing, the detector neuron may generate a response indicative of the detected representation.

At step 806 of method 800, network response is normalized by depressing connections providing input that is within a given interval from the detection signal. The network response normalization may comprise a reduction in activity of one or more neurons (that may be responding to the present view of the object). The activity reduction may be based on efficacy decrease (depression) of connection(s) providing the stimulus associated with the present view. In some approaches, the network response normalization may comprise an activity of one or more neurons that may be responding to the previous and/or subsequent views of the object. The activity increase may be based on efficacy increase (potentiation) of connection(s) providing the stimulus associated with the previous and/or subsequent views.

Response normalization may be based on competition between neurons such that a portion (1%-20%) of the whole neuron population may respond at any given period of time.

Various exemplary spiking network apparatus comprising the bi-modal plasticity mechanism of the disclosure are described below with respect to FIGS. 9A-11C.

Figure 9A:
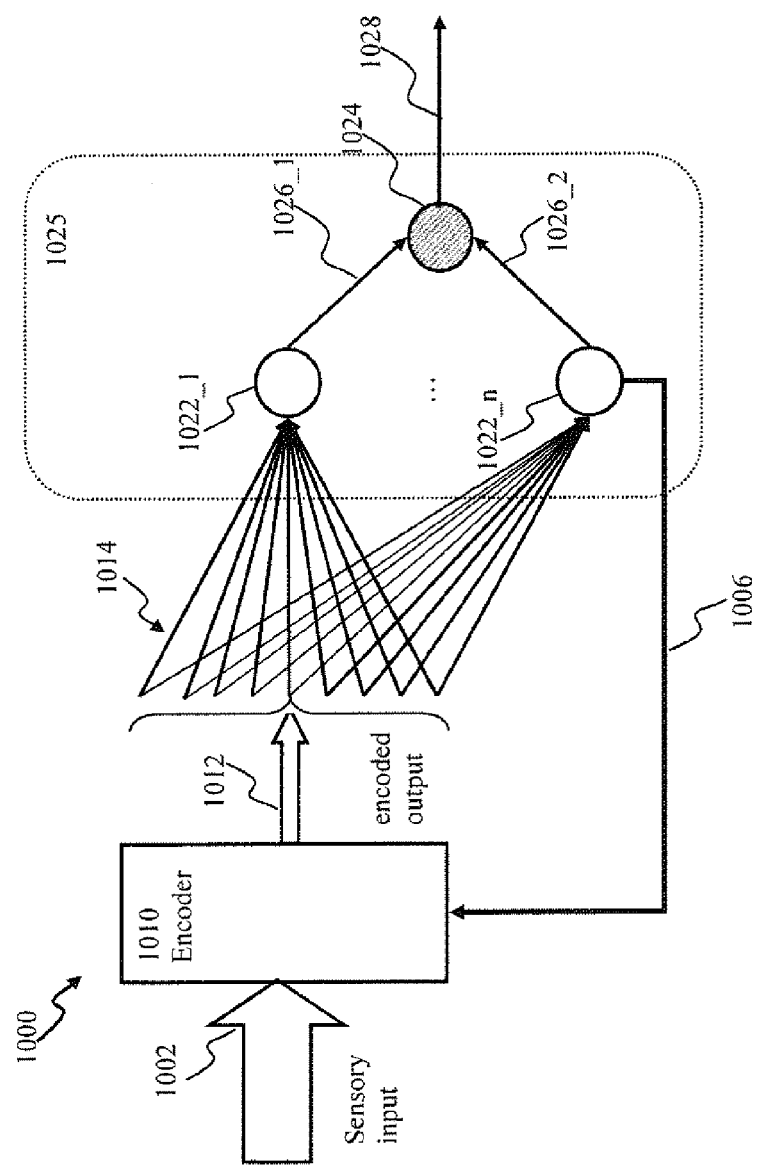
FIG. 9A is a block diagram illustrating a visual processing apparatus comprising temporally proximate feature encoding mechanism configured in accordance with one or more implementations.

One such apparatus configured to process of visual information using a plasticity mechanism of, for example, FIGS. 5A-5E, is illustrated in FIG. 9A. The apparatus 1000 may comprise an encoder 1010 that may be configured to receive sensory input 1002. In some applications, such as, an artificial retinal prosthetic, the input 1002 may be a visual input, and the encoder 1010 may comprise one or more diffusively coupled photoreceptive layer as described in U.S. patent application Ser. No. 13/540,429, entitled "SENSORY PROCESSING APPARATUS AND METHODS", incorporated supra. The visual input may comprise, for instance, ambient visual light captured through, inter alia, an eye lens. For example for the encoding of light gathered by a lens 1064 in visual capturing device 1060 (e.g., telescope, motion or still camera) illustrated in FIG. 10, the visual input comprises ambient light stimulus 1062 captured by device lens 1064. In one or more implementations, (such as, the encoder 1076 configured for processing of digitized images a processing apparatus 1070 described with respect to FIG. 10 below), the sensory input 1002 of FIG. 9A comprises digitized frame pixel values (RGB, CMYK, grayscale) refreshed at suitable rate. It will be appreciated that other sensory modalities (e.g., somatosensory and/or gustatory) may be implemented.

Figure 10:
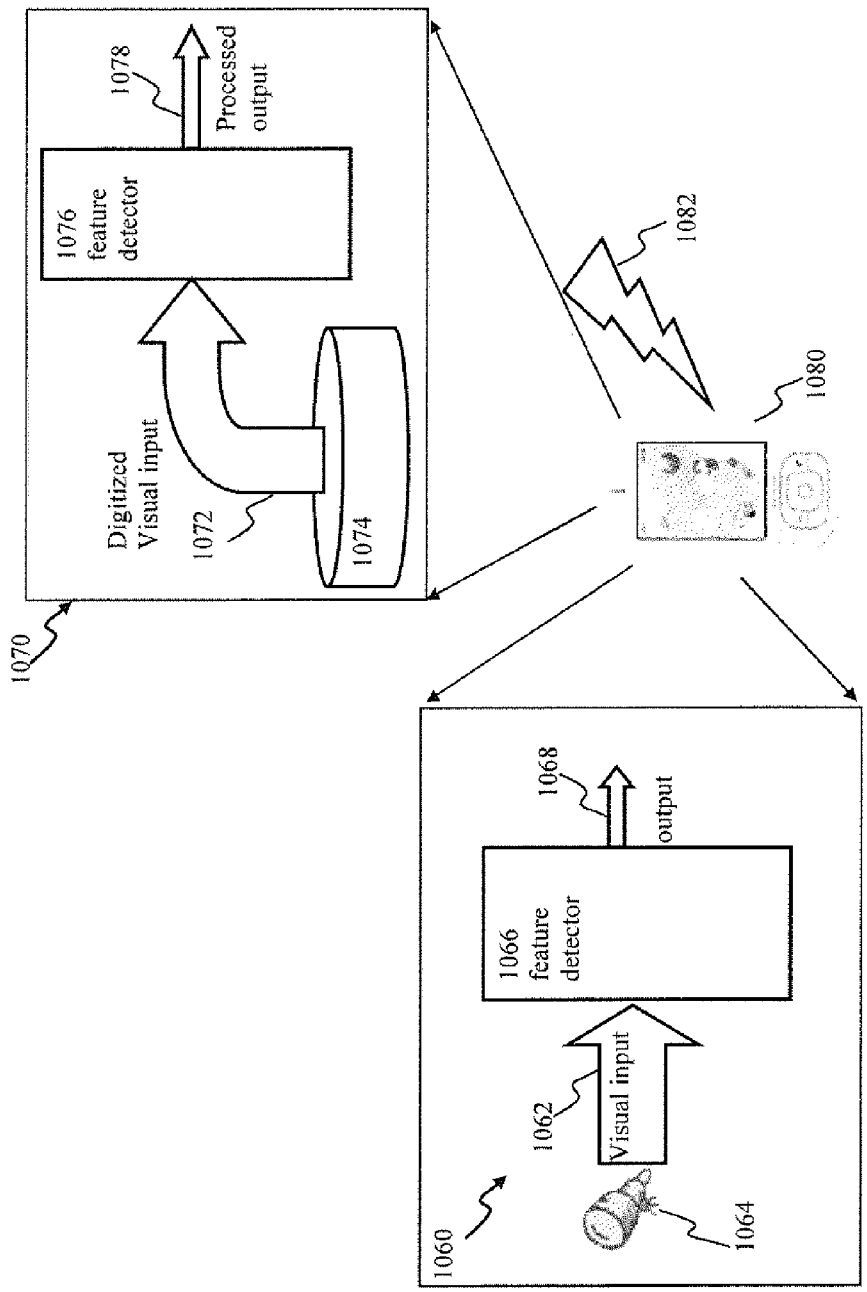
FIG. 10 is a block diagram illustrating an encoder apparatus (such as for instance that of FIG. 9A) configured for use in an image processing device adapted to process (1) visual signal; and/or (ii) processing of digitized image, in accordance with one or more implementations of the disclosure.

The input may comprise light gathered by a lens of a portable video communication device, such as the device 1080 shown in FIG. 10. In one implementation, the portable device comprises a smartphone configured to process still and/or video images using a diffusively coupled photoreceptive layer. The processing may comprise for instance image encoding and/or image compression using, for example, a processing neuron layer. In some approaches, encoding and/or compression of the image may be utilized to aid communication of video data via remote link (e.g., cellular, Bluetooth, Wi-Fi, LTE, etc.), thereby reducing bandwidth demands on the link.

In some implementations, the input may comprise light gathered by a lens of an autonomous robotic device (e.g., a rover, an autonomous unmanned vehicle, etc.), which may include, for example, a camera configured to process still and/or video images using, inter alia, one or more diffusively coupled photoreceptive layers. The processing may comprise image encoding and/or image compression, using for example processing neuron layer. For instance, higher responsiveness of the diffusively coupled photoreceptive layer may advantageously be utilized in rover navigation and/or obstacle avoidance.

It will be appreciated by those skilled in the art that the apparatus 1000 may be also used to process inputs of various electromagnetic wavelengths, such as, visible, infrared, ultraviolet light, and/or combination thereof. Furthermore, the bi-modal plasticity methodology of the disclosure may be equally useful for encoding radio frequency (RF), magnetic, electric, or sound wave information.

Returning now to FIG. 9A, the input 1002 may be encoded by the encoder 1010 using, inter cilia, spike latency encoding mechanism described by Eqn. 2.

In one implementation, such as illustrated in FIG. 9A, the apparatus 1000 may comprise a neural spiking network 1025 configured to detect an object and/or object features using, for example, context aided object recognition methodology described in U.S. patent application Ser. No. 13/488,114, filed Jun. 4, 2012, entitled "SPIKING NEURAL NETWORK OBJECT RECOGNITION APPARATUS AND METHODS", incorporated herein by reference in its entirety. In one such implementation, the encoded input 1012 may comprise a plurality of pulses (also referred to as a group of pulses) transmitted from the encoder 1010 via multiple connections (also referred to as transmission channels, communication channels, or synaptic connections) 1014 to one or more neuron units (also referred to as the detectors) 1022 of the spiking network apparatus 1025. Although only two detectors (1022_1, 1022_n) are shown in the implementation of FIG. 9A (for reasons of clarity), it is appreciated that the encoder 1010 may be coupled to any number of detector nodes that may be compatible with the apparatus 1000 hardware and software limitations. Furthermore, a single detector node may be coupled to any practical number of encoders.

In one implementation, the detectors 1022_1, 1022_n may contain logic (which may be implemented as a software code, hardware logic, or a combination of thereof) configured to recognize a predetermined pattern of pulses in the signal 1012, using any of the mechanisms described, for example, in the U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117, 048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", to produce post-synaptic detection signals transmitted over communication channels 1026. In one or more implementations, the detection signals produced by the detector 1022 may correspond to an object being present in the receptive field of the respective detector (e.g., as shown and described with respect to FIGS. 2, 4A).

The detection signals may be delivered to a next layer of the detectors (e.g., 1024 in FIG. 9A) via connections 1026. In some implementations, the connections 1026 may be operable in accordance with one or more bi-modal plasticity mechanisms, such as those described with respect to FIG. 5A-5E. The detector 1024 may be configured to detect the presence of an object in the sensory input 1002 by learning to recognize temporally proximate representations of the object in the successive frames of the sensory input. Based on the detection, the detector 1024 may provide a detection signal to other components (e.g., a motor control blocks, saccading block) via connection 1028. The detector 1024 (an/or additional detector layers) may be used recognition of complex object features and objects, similar to the description found in commonly owned U.S. patent application Ser. No. 13/152, 119, filed Jun. 2, 2011, entitled "SENSORY INPUT PROCESSING APPARATUS AND METHODS". In such implementations, each subsequent layer of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphanumeric recognition by the apparatus.

The sensory processing apparatus implementation illustrated in FIG. 9A may further comprise feedback connections 1006. In some variants, connections 1006 may be configured to communicate context information as described in detail in U.S. patent application Ser. No. 13/465,924, entitled "SPIKING NEURAL NETWORK FEEDBACK APPARATUS AND METHODS", filed May 7, 2012, incorporated supra.

Figure 9B:
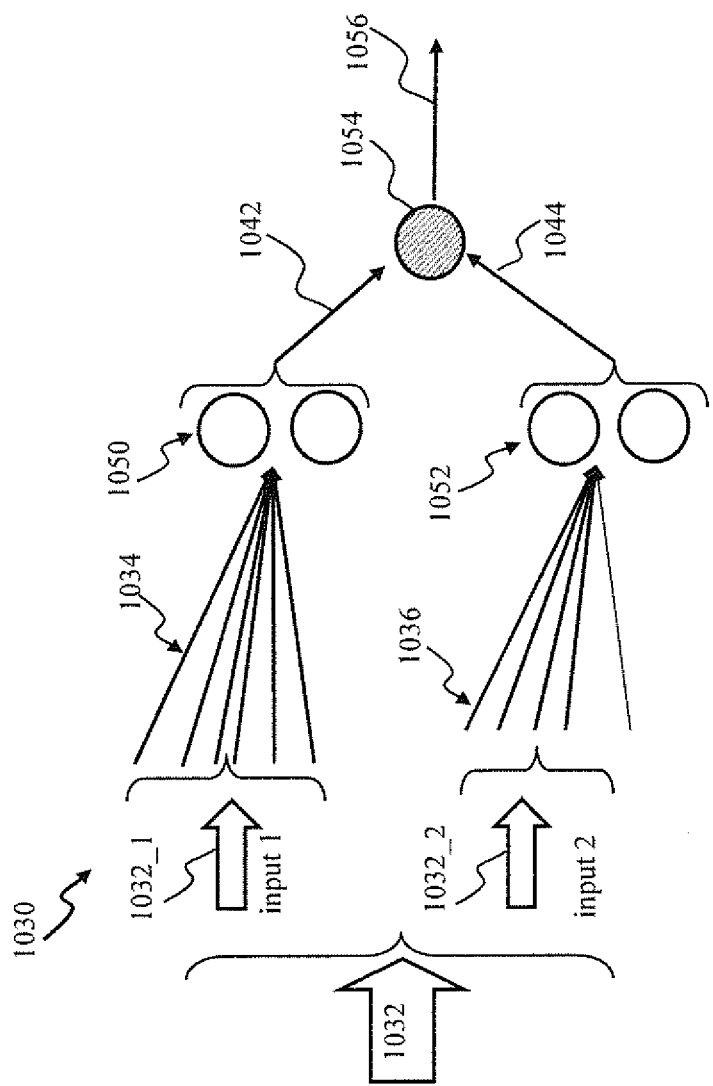
FIG. 9B is a block diagram illustrating a sensory processing apparatus configured to encode two sensory input attributes, in accordance with one or more implementations of the disclosure.

FIG. 9B illustrates a spiking neuron network processing apparatus configured to encode two sensory input attributes, in accordance with one or more implementations.

The apparatus 1030 may comprise one or more encoders configured to receive sensory input 1032. In some visual processing applications, the input may comprise visual input composed of two or more channels characterizing two or more aspects of the input (e.g., chromaticity and luminance). In sensory processing applications, the input 1032_1, 1032_2 may comprise two or more modalities (e.g., visual and audio). In remote sensing applications, the input 1032_1, 1032_2 may comprise two or more sensor inputs (e.g., infrared, visual, radio frequency, sound, X-ray, and or other signals).

Encoded input may comprise a plurality of pulses that may be communicated to detectors 1050, 1052 via connections 1034, 1036. Although only two detectors (1050, 1052) are shown in the implementation of FIG. 9B (for reasons of clarity), it is appreciated that the encoder of the apparatus 1030 1010 may be coupled to any number of detector nodes that may be compatible with the apparatus 1030 hardware and software. Furthermore, a single detector node may be coupled to any practical number of encoders.

In one or more implementations, the detectors 1050, 1052 may contain logic (which may be implemented as a software code, hardware logic, or a combination of thereof) configured to recognize a predetermined pattern of pulses in the signals 1032. 1034, using any of the mechanisms described above with respect to FIG. 9A. The detectors 1050, 1052 may be configured to produce detection signals. The detection signals produced by the detectors 1050, 1052 may correspond to, for example, an object being present in the receptive field of the respective detector (e.g., as shown and described with respect to FIGS. 2, 4A).

The detection signals may be delivered to a successive layer of detectors (e.g., 1054 in FIG. 9B) via connections 1044, 1046. Connections 1044, 1046 may be operable in accordance with one or more bi-modal plasticity mechanisms (such as those described with respect to FIG. 5A-5E). In some implementations, detector 1054 may be configured to detect presence of an object in the sensory input 1032 by learning to recognize temporally proximate representations of the object in successive frames of the sensory input. The object detection may comprise signal integration across sensory modalities, such as learning that the sound of a cat and image of a cat may often be temporally proximal to one another. Based on the detection, the detector 1054 may provide detection signal to other components (e.g., a motor control blocks, saccading block) via connection 1056.

FIG. 10, illustrates some exemplary implementations of the spiking network processing apparatus 1000 of FIG. 9A. The visual processing apparatus 1030 comprises a feature detector 1066, adapted for use with ambient visual input 1062. The detector 1066 of the processing apparatus 1060 is disposed behind a light gathering block 1064 and receive ambient light stimulus 1062. The light gathering block 1064 may comprise a telescope, motion or still camera, microscope. Accordingly, the visual input 1062 may comprise ambient light captured by a lens. The light gathering block 1064 may further comprise an imager apparatus (e.g., CCD, or an active-pixel sensor array) and may generate a stream of pixel values.

In various implementations, a bi-modal plasticity mechanism may be employed in the visual processing apparatus 1070 shown and described with respect to FIG. 10. The visual processing apparatus 1070 may be configured for digitized visual input processing. The visual processing apparatus 1070 may comprise an object detector 1076, adapted for use with digitized visual input 1072. The visual input 1072 of FIG. 10 may comprise for example digitized frame pixel values (RGB, CMYK, grayscale) that may be refreshed from a digital storage device 1074 at a suitable rate.

The encoder apparatus 1066, 1076 may employ for example spiking neuron network, configured in accordance with one or more bi-modal plasticity rules, such as described with respect to FIGS. 5A-5E, supra.

In one or more implementations, the video capture device 1160 and/or processing apparatus 1070 may be embodied in a portable visual communications device 1080, such as smartphone, digital camera, security camera, and/or digital video recorder apparatus, etc. The feature detection techniques of the present disclosure may be used to compress visual input (e.g., 1062, 1072 in FIG. 10) in order to reduce the bandwidth that may be utilized for transmitting processed output (e.g., the output 1068, 1078 in FIG. 10) by the apparatus 1080 via a wireless communications link 1082 in FIG. 10.

One exemplary implementation of the computerized neuromorphic processing system, for implementing the bi-modal plasticity rules described herein, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100. One such implementation may comprise a central processing apparatus, configured to employ bi-modal plasticity and coupled to one or more remote camera devices.

The system 1100 further may comprise a random access memory (RAM) 1108, configured to store neuronal states and connection parameters and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra In some implementations, the memory 1108 may be coupled to the processor 1102 via a direct connection (memory bus) 1116, and/or via a high-speed processor bus 1112). In some implementations, the memory 1108 may be embodied within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operational models of neurons, etc.). The nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to embodiments of the invention including, for example, an LCD/LED monitor, touch-screen input and display device, speech input device, stylus, light pen, trackball, and the like.

Figure 11B:
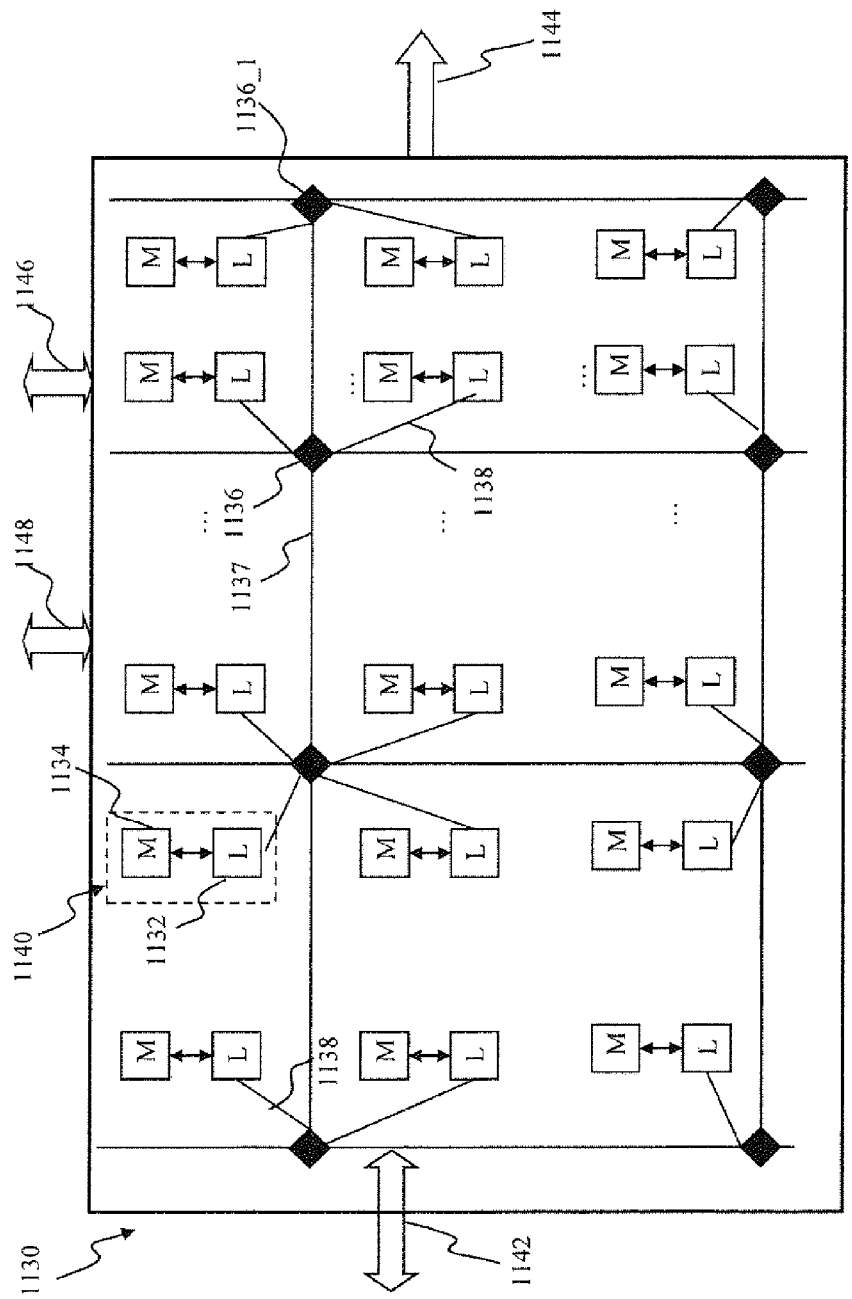
FIG. 11B is a block diagram illustrating a neuromorphic computerized system useful with useful with a temporally proximate feature encoding mechanism in accordance with one or more implementations.

FIG. 11B, depicts a neuromorphic computerized system configured for implementing spiking neuron networks comprising bi-modal (or the single-modal) plasticity methodology described supra. The neuromorphic processing system 1130 of FIG. 11B may comprise a plurality of processing blocks (micro-blocks) 1140, where individual micro cores may comprise logic block 1132 and memory block 1134, denoted by 'L' and 'M' rectangles, respectively, in FIG. 11B. The logic block 1132 may be configured to implement various aspects of feature detection, such as the latency encoding of Eqn. 2, neuron unit dynamic model, detector nodes 1022 of FIG. 9A, and/or nodes 1050, 1052 of FIG. 9B. The logic block may implement connection updates (e.g., the connections 1014, 1026 in FIG. 9A) and/or other tasks relevant to network operation. In some realizations, the update rules may comprise rules spike time dependent plasticity (STDP) updates, such as shown and described with respect to FIGS. 5A-5E. The memory block 1134 may be configured to store, inter alia, neuronal state variables and connection parameters (e.g., weights, delays, I/O mapping) of connections 1138.

One or more micro-blocks 1140 may be interconnected via connections 1138, routers 1136, and/or a bus 1137. In one or more implementations (not shown), the router 1136 may be embodied within the micro-block 1140. It is appreciated by those skilled in the arts, the connection layout in FIG. 11B is exemplary and many other connection implementations (e.g., one to all, all to all, etc.) are compatible with the disclosure.

The neuromorphic apparatus 1130 may be configured to receive input (e.g., visual input) via the interface 1142. In one or more implementations, applicable for example to interfacing with a pixel array. The apparatus 1130 may also provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
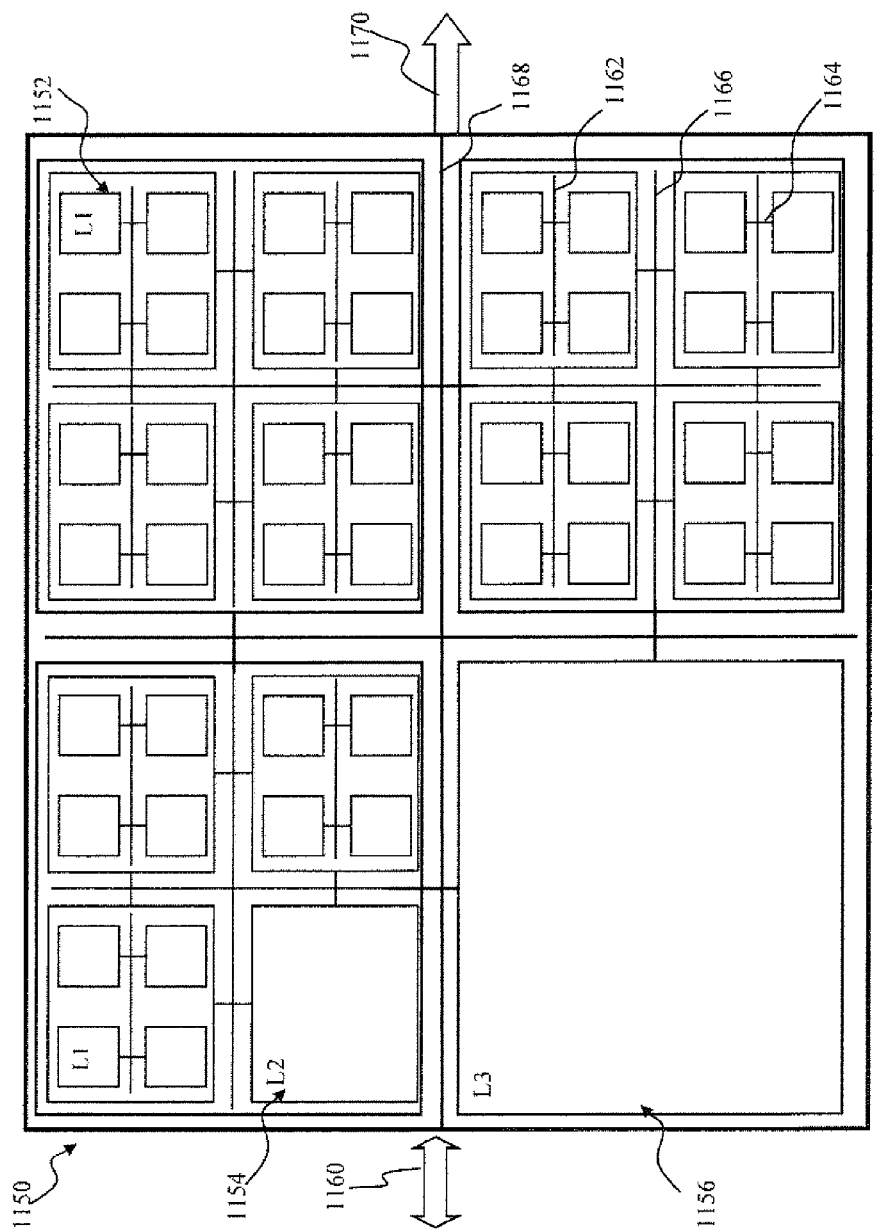
FIG. 11C is a block diagram illustrating a hierarchical neuromorphic computerized system architecture useful with temporally proximate feature encoding mechanism configured in accordance with one or more implementations.

FIG. 11C, illustrates a cell-based hierarchical neuromorphic system architecture configured to implement a spiking neuron network comprising the bi-modal (or the single-modal) plasticity methodology described supra. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranges in a cluster 1154 and communicate with one another via local interconnects 1162, 1164. Each such cluster may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level, shown in FIG. 11C represents one exemplary implementation and other implementations may comprise more or fewer cells/level and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating, for example, a robot/ The robot may have one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. To interface with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, etc.). The apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place. Exemplary embodiments of this process are described in co-pending and co-owned U.S. patent application Ser. No. 13/487,576, entitled "DYNAMICALLY RECONFIGURABLE STOCHASTIC LEARNING APPARATUS AND METHODS", incorporated supra.

The networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or a High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing being incorporated herein by reference in its entirety. In some approaches, the HLND framework may be configured to handle event-based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, in U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and U.S. patent application Ser. No. 13/385,938, entitled "APPARATUS AND METHODS FOR EFFICIENT UPDATES SPIKING NEURON NETWORKS", filed Jul. 27, 2012, each of the foregoing being incorporated herein by reference in its entirety.

In some implementations, the HLND framework may be utilized to define network, unit type and location, and/or synaptic connectivity. HLND tags and/or coordinate parameters may be utilized in order to, for example, define an area of the localized inhibition of the disclosure described above In some implementations, the END may be used to describe and/or simulate large-scale neuronal model using software and/or hardware engines. The END allows optimal architecture realizations comprising a high-performance parallel processing of spiking networks with spike-timing dependent plasticity. Neuronal network configured in accordance with the END may comprise units and doublets, the doublets being connected to a pair of units. Execution of unit update rules for the plurality of units is order-independent and execution of doublet event rules for the plurality of doublets is order-independent.

In one or more implementations, the efficient update methodology (e.g., for adjusting input connections and/or inhibitory traces) may comprise performing of pre-synaptic updates first, followed by the post-synaptic updates, thus ensuring the up-to-date status of synaptic connections.

In some implementations, the efficient update methodology may comprise rules, configured to adjust inhibitory trace without necessitating evaluation of the neuron post-synaptic response.

Various aspects of the disclosure may advantageously be applied to design and operation of apparatus configured to process sensory data. Utilizing the temporal continuity of spatial transformations of an object may allow a learning system to bind temporally proximal entities into a single object, as opposed to several separate objects. This may reduce memory requirement for storing object data, increase processing speed, and/or improve object detection/recognition accuracy. These advantages may be leveraged to increase processing throughput (for a given neuromorphic hardware resources) and/or perform the same processing with a reduced complexity and/or cost hardware platform, compared to the prior art.

In neuroscience applications, learning patterns that are temporally proximal may be used to aid modeling of learning by complex cells of mammalian visual cortex (e.g., cells of V1 area). Learning to detect temporally proximate object representations may enable implementations of models characterizing complex cells in other areas of the cortex (e.g., V2 of visual area, and/or audio).

The principles described herein may be combined with other mechanisms of data encoding in neural networks, such as those described in U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARA- TUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, various of the teachings of the disclosure can be used to simplify tasks related to motion estimation, such as where an image sequence is processed to produce an estimate of the object position and velocity (either at each point in the image or in the 3D scene, or even of the camera that produces the images). Examples of such tasks include ego motion, i.e., determining the three-dimensional rigid motion (rotation and translation) of the camera from an image sequence produced by the camera, and following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A method of updating a connection providing stimulus to an artificial spiking neuron, the method comprising:
   determining a spike time based on a first spike of the neuron generated based at least in part on at least one stimulus received via at least one of a plurality of connections to the neuron;
   determining a depression interval based at least in part on the spike time, the depression interval having a first boundary that is set at a pre-determined time before the spike time and a second boundary that is set at a pre-determined time after the spike time;
   depressing a connection of the plurality of connections when a stimulus from the connection is received within the depression interval, the depression being configured to increase a time between a second spike and the first spike; and
   potentiating a connection of the plurality of connections when a stimulus from the connection is received outside the depression interval, the potentiation being configured to decrease the time between the second spike and the first spike.

2. The method of claim 1, wherein:
   each connection of the plurality of connections comprise a latency parameter configured to provide a delay for transmissions of stimulus to the neuron;
   potentiating the connection comprises reducing the latency parameter to decrease the delay; and
   depressing the connection comprises increasing the latency parameter to increase the delay.

* * * * *